United States Patent
Shibata et al.

(12)

(10) Patent No.: US 6,285,391 B1
(45) Date of Patent: *Sep. 4, 2001

(54) PICTURE CODEC AND TELECONFERENCE TERMINAL EQUIPMENT

(75) Inventors: Yoji Shibata, Yokosuka; Masaaki Takizawa, Tokyo; Hitoshi Matsushima, Tachikawa; Hiroshi Yoshikawa, Fujisawa; Atsuo Yoshida, Kokubunji; Toru Ebihara, Higashimurayama; Jun Furuya, Kokubunji; Yukinobu Maruyama, Tokyo; Takehiko Yamada, Chiqasaki, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/559,357

(22) Filed: Apr. 27, 2000

Related U.S. Application Data

(63) Continuation of application No. 08/997,810, filed on Dec. 24, 1997, now abandoned, and a continuation of application No. 08/782,495, filed on Jan. 10, 1997, now Pat. No. 5,777,663, which is a continuation of application No. 08/509,591, filed on Jul. 31, 1995, now Pat. No. 5,689,300, which is a continuation-in-part of application No. 08/384,955, filed on Feb. 7, 1995, now Pat. No. 5,677,727, which is a continuation of application No. 07/913,402, filed on Jul. 15, 1992, now Pat. No. 5,790,178, which is a continuation of application No. 07/838,348, filed on Feb. 20, 1992, now Pat. No. 5,396,269.

(30) Foreign Application Priority Data

Jul. 15, 1991 (JP) .................................................. 3-174049
Jan. 24, 1992 (JP) ...................................................... 4-11196

(51) Int. Cl.$^7$ ...................................................... H04N 7/14
(52) U.S. Cl. .................... 348/14.07; 379/202; 379/93.21

(58) Field of Search .............................. 348/14.01, 14.08, 348/14.1, 14.14, 14.15, 14.07; 379/93.01, 93.05–93.08, 93.17, 93.21, 202, 201, 90.01; 358/400, 479, 487

(56) References Cited

U.S. PATENT DOCUMENTS

| D. 308,222 | 5/1990 | Sano et al. ............................. D18/36 |
| D. 323,819 | 2/1992 | Iimura ................................. D16/223 |

(List continued on next page.)

FOREIGN PATENT DOCUMENTS

| 2952660 | 7/1981 | (DE) . |
| 3334428 | 4/1985 | (DE) . |

(List continued on next page.)

OTHER PUBLICATIONS

G.S. Bhusri, "Considerations for ISDN Planning and Implementation", IEEE Communications Magazine, Jan. 1984, vol. 22, No. 1, pp. 18–32.

(List continued on next page.)

*Primary Examiner*—Wing F. Chan
(74) *Attorney, Agent, or Firm*—Antonelli, Terry, Stout & Kraus, LLP

(57) ABSTRACT

In a teleconference terminal equipment; a picture codec for simultaneously displaying a still picture and video on a single screen, comprising an analog-to-digital converter which converts a picture signal into digital picture data, a picture-in-picture processor which is supplied with the digital picture data as self-picture data of the terminal equipment, a video decoder or a still picture decoder which decodes input picture data and delivers the decoded data to the P-in-P processor, and a digital-to-analog converter which is supplied with picture data for forming a P-in-P frame, having been produced from the self-picture data and the decoded data by the P-in-P processor, and which converts the supplied picture data into an analog signal and delivers the analog signal as an output.

16 Claims, 36 Drawing Sheets

U.S. PATENT DOCUMENTS

| | | | |
|---|---|---|---|
| D. 327,672 | 7/1992 | Iimura | D16/232 |
| D. 342,272 | 12/1993 | Saito et al. | D16/208 |
| 3,970,792 | 7/1976 | Benham et al. | 379/53 |
| 4,054,908 | 10/1977 | Poirier et al. | 348/15 |
| 4,238,773 | 12/1980 | Tsuboka et al. . | |
| 4,244,649 | 1/1981 | Rees et al. | 355/61 |
| 4,258,387 | 3/1981 | Lemelson et al. | 358/85 |
| 4,289,932 | 9/1981 | Reed | 179/18 BC |
| 4,415,136 | 11/1983 | Knoll | 248/921 |
| 4,457,610 | 7/1984 | Kawazoe | 354/293 |
| 4,516,156 | 5/1985 | Fabris et al. | 358/85 |
| 4,531,024 | 7/1985 | Colton et al. | 179/2 |
| 4,562,988 | 1/1986 | Bumgardner | 248/921 |
| 4,574,374 | 3/1986 | Scordo . | |
| 4,589,713 | 5/1986 | Pfutil et al. | 248/921 |
| 4,645,872 | 2/1987 | Pressman et al. | 379/54 |
| 4,650,929 | 3/1987 | Boerger et al. | 379/54 |
| 4,710,917 | 12/1987 | Tompkins et al. | 370/62 |
| 4,741,025 | 4/1988 | Maruyama et al. | 379/202 |
| 4,816,901 | 3/1989 | Music et al. | 358/85 |
| 4,831,455 | 5/1989 | Ishikawa et al. | 358/229 |
| 4,834,329 | 5/1989 | Delapp | 248/923 |
| 4,847,829 | 7/1989 | Tompkins . | |
| 4,856,045 | 8/1989 | Hoshina | 348/14 |
| 4,882,743 | 11/1989 | Mahmoud | 379/53 |
| 4,887,158 | 12/1989 | Guichard et al. | 348/17 |
| 4,888,795 | 12/1989 | Ando et al. . | |
| 4,907,221 | 3/1990 | Paniani . | |
| 4,916,550 | 4/1990 | Miyake et al. | 358/229 |
| 4,916,735 | 4/1990 | Iida et al. . | |
| 4,924,311 | 5/1990 | Ohki et al. | 379/53 |
| 4,928,300 | 5/1990 | Ogawa et al. | 348/14 |
| 4,935,953 | 6/1990 | Appel et al. | 318/19 |
| 4,953,159 | 8/1990 | Hayden et al. | 379/53 |
| 4,961,211 | 10/1990 | Tsugane et al. | 379/54 |
| 4,965,819 | 10/1990 | Kannes | 379/53 |
| 4,979,028 | 12/1990 | Minematsu et al. . | |
| 4,980,761 | 12/1990 | Natori et al. . | |
| 4,995,071 | 2/1991 | Weber et al. | 358/85 |
| 4,998,243 | 3/1991 | Kao . | |
| 5,003,532 | 3/1991 | Ashida et al. . | |
| 5,012,348 | 4/1991 | Witzel et al. | 358/85 |
| 5,014,267 | 5/1991 | Tompskin et al. | 370/62 |
| 5,020,098 | 5/1991 | Celli | 370/62 |
| 5,036,390 | 7/1991 | Masunaga et al. | 348/14 |
| 5,061,992 | 10/1991 | Ueno . | |
| 5,062,136 | 10/1991 | Gattis . | |
| 5,063,440 | 11/1991 | Hong | 348/18 |
| 5,073,926 | 12/1991 | Suzuki et al. | 379/53 |
| 5,077,784 | 12/1991 | Fujita et al. . | |
| 5,111,498 | 5/1992 | Guichard et al. | 348/20 |
| 5,130,817 | 7/1992 | Iwaki | 379/100 |
| 5,175,727 | 12/1992 | Mahen et al. | 370/62 |
| 5,191,601 | 3/1993 | Ida et al. | 348/14 |
| 5,206,721 | 4/1993 | Ashida et al. | 379/54 |
| 5,210,794 | 5/1993 | Brunsgard | 370/62 |
| 5,247,330 | 9/1993 | Ohyama et al. | 348/373 |
| 5,268,904 | 12/1993 | Umeda | 370/110.1 |
| 5,341,374 | 8/1994 | Lewer et al. | 370/62 |
| 5,365,265 | 11/1994 | Shibata et al. | 368/15 |
| 5,392,284 | 2/1995 | Sugiyama et al. . | |
| 5,396,269 | 3/1995 | Gotoh et al. | 348/14 |
| 5,400,068 | 3/1995 | Ishida et al. . | |
| 5,402,418 | 3/1995 | Shibata et al. | 370/62 |
| 5,418,560 | 5/1995 | Yasuda | 348/14 |
| 5,477,546 | 12/1995 | Shibata . | |
| 5,689,300 | * 11/1997 | Shibata et al. | 348/15 |
| 5,777,663 | * 7/1998 | Shibata et al. | 348/15 |
| 5,790,178 | * 8/1998 | Shibata et al. | 348/15 |

FOREIGN PATENT DOCUMENTS

| | | |
|---|---|---|
| 0349709 | 2/1991 | (DE) . |
| 310477 | 4/1989 | (EP) . |
| 0379354 | 1/1990 | (EP) . |
| 348623 | 1/1990 | (EP) . |
| 355838 | 2/1990 | (EP) . |
| 0410378 | 1/1991 | (EP) . |
| 0418396 | 3/1991 | (EP) . |
| 0436345 | 7/1991 | (EP) . |
| 2075114 | 11/1981 | (GB) . |
| 2174518 | 11/1986 | (GB) . |
| 2219464 | 12/1989 | (GB) . |
| 2221765 | 2/1990 | (GB) . |
| 0158182 | 9/1984 | (JP) . |
| 030888 | 2/1986 | (JP) . |
| 62226783 | 10/1987 | (JP) . |
| 6390953 | 4/1988 | (JP) . |
| 241959 | 1/1989 | (JP) . |
| 132243 | 2/1989 | (JP) . |
| 1007881 | 4/1989 | (JP) . |
| 0149664 | 6/1989 | (JP) . |
| 0243681 | 9/1989 | (JP) . |
| 0300786 | 12/1989 | (JP) . |
| 222989 | 1/1990 | (JP) . |
| 239790 | 2/1990 | (JP) . |
| 69088 | 3/1990 | (JP) . |
| 2039693 | 4/1990 | (JP) . |
| 0119488 | 5/1990 | (JP) . |
| 2095069 | 6/1990 | (JP) . |
| 2095090 | 6/1990 | (JP) . |
| 2104080 | 7/1990 | (JP) . |
| 2192380 | 7/1990 | (JP) . |
| 2193483 | 7/1990 | (JP) . |
| 22037354 | 12/1990 | (JP) . |
| 2260871 | 1/1991 | (JP) . |
| 2260882 | 1/1991 | (JP) . |
| 316390 | 1/1991 | (JP) . |
| 3035679 | 4/1991 | (JP) . |
| 385837 | 4/1991 | (JP) . |
| 393377 | 4/1991 | (JP) . |
| 4029489 | 1/1992 | (JP) . |
| 4150686 | 5/1992 | (JP) . |
| 4156194 | 9/1992 | (JP) . |
| 4265086 | 9/1992 | (JP) . |
| 4265087 | 9/1992 | (JP) . |
| 8601060 | 2/1986 | (WO) . |

OTHER PUBLICATIONS

Advertisement pages of the Oct. 1986 issues of *The British Journal of Photography*.

Networking in the Nineties, Bal Harbour, Apr. 7–11, 1991, "Personal Multimedia Multipoint Teleconference System", H. Tanigawa et al, Institute of Electrical and Electronics Engineers, vol. 3, Apr. 7, 1991.

NTZ Nachrichtentechnishche Zeitschrift, "Multimedia–BK– Technik Zur Unterstuetzung Verteilter Gruppenabeit", W.B. Korte, vol. 43, No. 12, Dec. 1, 1990, Berlin, DE.

L. van Loon, "An Experimental Video Telephone Network", Philips Telecommunications Review, vol. 32, No. 1, pp. 11–24, Apr., 1974.

Hase, et al, "Advanced Videophone System using Synchronized Video Filing Equipement", NTT Review, Jul. 3, 1991, vol. 3, No. 4, pp. 29–36.

P. Uppaluru, "An Overview of the Fluent Video System Architecture", Digest of Papers, Spring Compcon '91, 36$^{th}$ IEEE Computer Society International Conference, Feb. 25–Mar. 1, 1991, pp. 340–342.

Ensor et al, "Control Issues in Multimedia Conferencing", IEEE Communications for Distributed Applications and Systems, Apr. 18, 1991, pp. 133–143.

S. Saunders, "For Videophones, Light at the End of a Very Long Tunnel", Data Communications, Dec. 1991, vol. 20, No. 17, p. 116.

T. Hisaki et al, "Video Communication Terminals for Broadband Switching Network Services", Review of the Electrical Communication Laboratories, 1985, No. 4, Tokyo, Japan.

W. Speltacker, "Endergate fur die Bildkommunikation im ISDN", Telematica, Nov. 28, 1989.

The Collection of Lectures and Papers, vol. 7, D–419, D–420, D–421, D–422, D–423 and D–424 presented at the National Spring Meeting of the Japanese Electric Information Society.

Bell's Visual Terminal Uses Plasma Display, Electronic Week, Apr. 1976, vol. 49, No. 1, p. 36.

* cited by examiner

F I G. 1
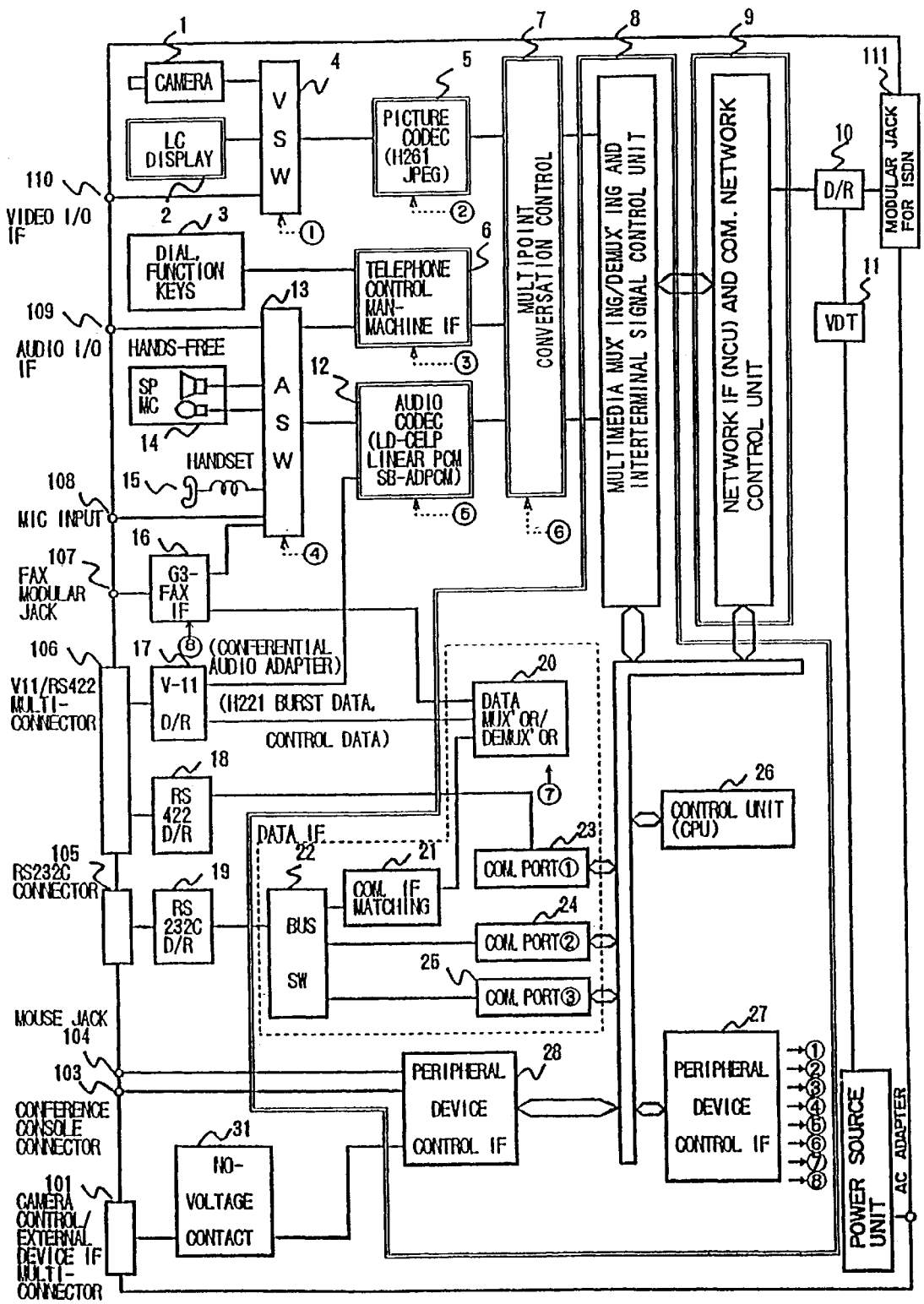

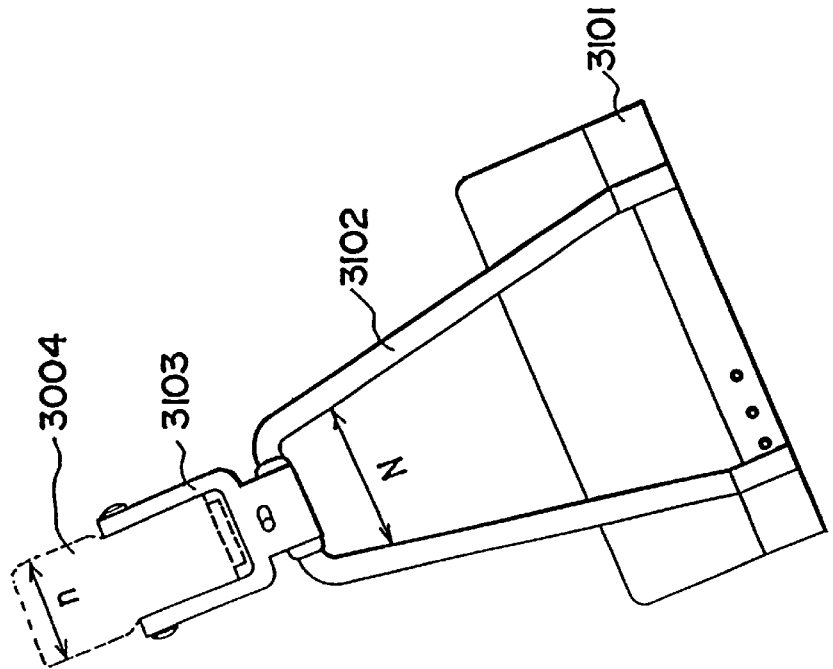
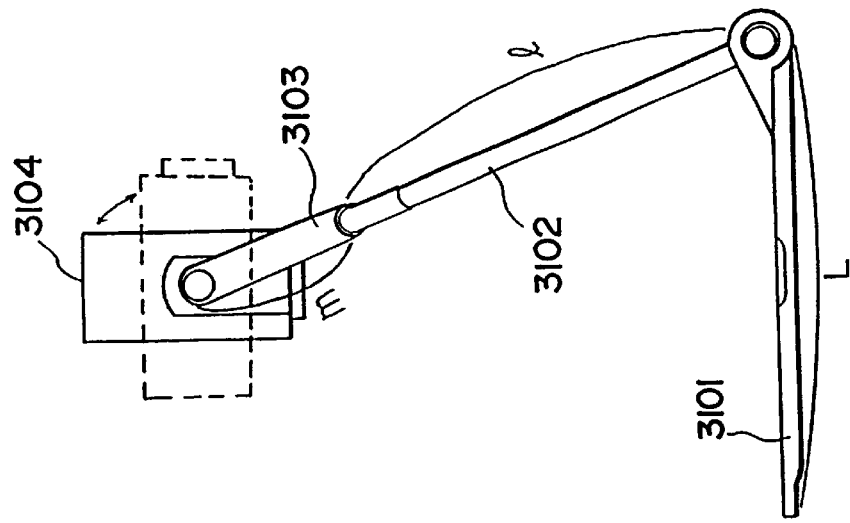
FIG. 25A
FIG. 25B

2130

2920

PICTURE CODEC AND TELECONFERENCE TERMINAL EQUIPMENT

This is a continuation of application Ser. No. 08/997,810, filed Dec. 24, 1997, now abandoned; Ser. No. 08/782,495, filed Jan. 10, 1997, now U.S. Pat. No. 5,777,663; which is continuation of Ser. No. 08/509,591, filed Jul. 31, 1995, now U.S. Pat. No. 5,689,300; which is a continuation of application Ser. No. 07/913,402, filed Jul. 15, 1992, now U.S. Pat. No. 5,790,178; and a continuation-in-part of application Ser. No. 08/384,955, filed Feb. 7, 1995, now U.S. Pat. No. 5,677,727; which is a continuation of application Ser. No. 07/838,348, filed Feb. 20, 1992, now U.S. Pat. No. 5,396,269.

BACKGROUND OF THE INVENTION

1. Field of the Invention

The present invention relates to a teleconference system which makes it possible to hold an audio and video meeting between distant places connected by a communications network.

2. Description of the Prior Art

A prior-art equipment for a teleconference system is constructed by combining independent devices such as a display unit, a codec, a camera, a microphone and a console. In some cases, a document camera, an electronic blackboard and a small-sized computer are further combined in accordance with functions required for conferences.

Moreover, since such a prior-art teleconference equipment constructed by combining the independent devices is large in scale, a teleconference room for exclusive use is usually required for the teleconference. On the other hand, there is also an equipment for a teleconference system wherein fundamental devices are housed in a single rack so as to be movable, thereby dispensing with the need for a conference room for exclusive use.

In the teleconference system thus constructed, ordinarily still pictures and video can be exchanged between the terminals of the system.

Techniques relevant to the teleconference equipments are disclosed in the official gazettes of Japanese Patent Applications Laid-open No. 39790/1990 and No. 22989/1990.

In addition, Japanese Patent Applications concerning teleconference systems filed by the assignee of the present application are Patent Applications Laid-open Nos. 120889/1992 and 166884/1991, and Patent Application Nos. 406984/1990, 25987/1991, 25991/1991, 174025/1991, 174046/1991, 174031/1991, 34009/1991 and 27086/1991.

Meanwhile, in the prior-art equipment for the teleconference system, the codec includes an A/D (analog-to-digital) converter and a D/A (digital-to-analog) converter for each of a still picture and video, and the still picture display and video display of a display unit are changed-over by switching a still picture signal and a motion picture signal which are delivered from the two D/A converters.

Alternatively, the simultaneously display of the still pictures and video is realized by delivering the still picture and motion picture signals to two separate display units, respectively.

With the method wherein the still picture display and the video display are changed-over, the conversation of the pertinent communicating terminal with the opposite terminal is not conveyed smoothly on account of a complicated switching operation, etc.

On the other hand, with the method wherein the still picture signal and the motion picture signal are respectively displayed on the separate display units, these two display units are necessitated to render the terminal equipment large in size. Besides, while the user of the equipment is watching the still picture, his/her eyes shift widely and are inevitably averted from the opposite communicating person.

It is therefore an object of the present invention to provide a teleconference equipment in which a still picture and video can be simultaneously displayed on a single display screen.

In the prior-art teleconference system, the teleconference room for exclusive use needs to be prepared as stated before, so that the introduction of the teleconference system involves a heavy financial burden. Moreover, when holding the teleconference, conferees must move to the teleconference room which is inconvenient.

In this regard, even the portable teleconference equipment needs to be moved by several people on account of the size and weight thereof and cannot be used with ease.

Because of such circumstances, there has been a great demand in recent years for the ability to hold a teleconference more conveniently and more readily.

SUMMARY OF THE INVENTION

It is therefore another object of the present invention to provide a desktop type teleconference equipment which is small in size and which is easily portable.

In order to accomplish the objects, according to the present invention, there is provided a picture codec to which an analog picture signal, coded still picture data for playback and coded motion picture data for playback are input, and from which coded picture data obtained by coding the input analog picture signal and an analog picture signal obtained by decoding either of the input coded still picture data for playback and coded motion picture data for playback are output. The picture code comprises an analog-to-digital converter which converts the input analog picture signal into digital picture data, a still picture coder which codes the digital picture data produced by the analog-to-digital converter, so as to deliver coded still picture data, a video coder which codes the digital picture data produced by the analog-to-digital converter, so as to deliver coded motion picture data, a selector which selects either of the coded motion picture data delivered from the video coder and the coded still picture data delivered from the still picture coder, and which delivers the selected picture data as the output coded picture data, a still picture decoder which decodes the input coded still picture data for playback, into decoded still picture data, a video decoder which decodes the input coded motion picture data for playback, into decoded motion picture data, a picture-in-picture processor which generates picture-in-picture frame data on the basis of the decoded still picture data delivered from the still picture decoder, the decoded motion picture data delivered from the video decoder and the digital picture data delivered from the analog-to-digital converter, the picture-in-picture frame data forming a picture-in-picture frame which concerns at least two of the decoded still picture data, the decoded motion picture data and the digital picture data and a digital-to-analog converter which converts the picture-in-picture frame data generated by the picture-to-picture processor, into the output analog picture signal, and which delivers the output analog picture signal.

Further, there is provided a teleconference terminal equipment which comprises the picture codec as defined in the above paragraph, a communication control unit which transmits either of the coded still picture data and the coded motion picture data delivered from the picture codec, through a digital communication channel, and which receives either of the coded still picture data for playback and the coded motion picture data for playback through the digital communication channel and then delivers the received picture data to the picture codec, a camera which delivers the analog picture signal to the picture codec and a display unit which displays a picture indicated by the output analog picture signal of the picture codec.

Owing to the construction of the picture codec, a still picture and video can be simultaneously displayed on a single screen.

Moreover, the teleconference terminals equipment is small in size and is easily portable.

BRIEF DESCRIPTION OF THE DRAWINGS

FIG. 1 is a block diagram showing the general arrangement of a teleconference terminal equipment according to the first embodiment of the present invention;

FIGS. 25A and 25B are a side view and a rear view, respectively, of the first document photographing stand of the second embodiment;

PREFERRED EMBODIMENTS OF THE INVENTION

Figure 2:
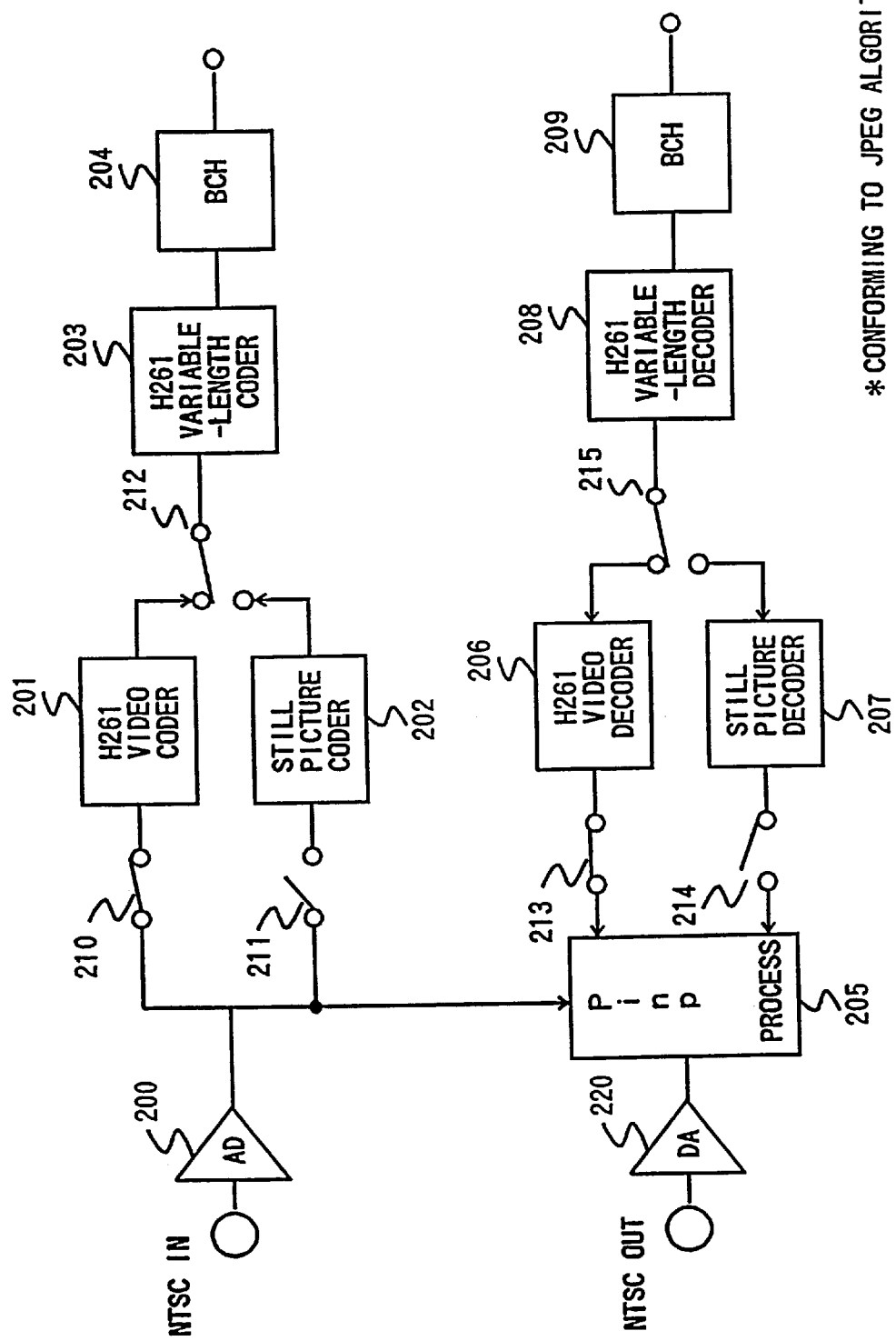
FIG. 2 is a block diagram showing the construction of a picture codec which is included in the teleconference terminal equipment of the first embodiment.

Now, the first embodiment of a teleconference terminal equipment according to the present invention will be described.

FIG. 1 illustrates the functional block arrangement of the teleconference terminal equipment in this embodiment.

As shown in the figure, the teleconference terminal equipment of this embodiment comprises a camera 1, an LCD (liquid-crystal display) 2, dial function keys 3, a VSW (video switch) 4, a picture codec 5, a telephone control man-machine interface 6, a multipoint conversation control 7, a multimedia multiplexing/demultiplexing and interterminal signal control unit 8, a network interface and communications network control unit 9, a D/R (driver) 10, a VDT (voltage detector) 11, an audio codec 12, an ASW (audio switch) 13, a hands-free set 14, a handset 15, a G3-FAX interface 16, a V11 D/R 17, an RS422 D/R 18, an RS232C D/R 19, a data multiplexor/demultiplexor 20, a communication interface matching section 21, a bus SW (switch) 22, communication ports 23~25, a control unit 26, peripheral device control interfaces 27~28, and a no-voltage contact 31.

In addition, as external input/output terminals, the teleconference terminal equipment comprises a video I/O interface 110, an audio I/O interface 109, a microphone input 108, a G3-FAX modular jack 107, a V11/RS422 multiconnector 106, an RS232C connector 105, a mouse jack 104, a conference console connector 103, and a camera control and external device multiconnector 101.

The network interface and communications network control unit 9 is connected to a digital communications network through the D/R 10, and it performs the communication controls and communication processing between the teleconference terminal equipment and the network, such as establishing a communication channel with the opposite communicating terminal equipment. The multimedia multiplexing/demultiplexing and interterminal signal control unit 8 performs various controls between the pertinent terminal equipment and the opposite terminal equipment. Besides, this control unit 8 demultiplexes video data, audio data, data to be multiplexed/demultiplexed, control data, etc. from within a received communication frame into the individual data types, and it multiplexes such types of data into a transmission communication frame. The video data mentioned above is interface data on the network side of the picture codec 5, while the audio data is interface data on the network side of the audio codec 12. The data to be multiplexed/demultiplexed is interface data with respect to the data multiplexor/demultiplexor 20. The control data is transferred between the control unit 8 and the control unit 6.

The data multiplexor/demultiplexor 20 further demultiplexes the demultiplexed from within the received communication frame by the multimedia multiplexing/demultiplexing and interterminal signal control unit 8, into individual data types in accordance with protocols stipulated with the opposite communicating terminal equipment beforehand.

Specifically, in a case where a frame stipulated in Consultative Committee on International Telephone and Telegraph (CCITT) Recommendation H. 221 is taken as the communication frame, the multimedia multiplexing/demultiplexing and interterminal signal control unit 8 transfers FAS or BAS data within the frame to and from the control unit 26, audio data to and from the audio codec 12, video data in, e.g., a frame stipulated in CCITT Recommendation H. 261 published January 1990 to and from the picture codec 5, and data to-be-multiplexed/demultiplexed to and from the data multiplexor/demultiplexor 20. Besides, in a case where MLP data is contained in the frame stipulated in Recommendation H. 221, it is transferred between the control unit 8 and either the control unit 26 or the data multiplexor/demultiplexor 20 under the control of the control unit 26.

Herein, the data multiplexor/demultiplexor 20 demultiplexes the data to-be-demultiplexed into G3-FAX data, computer data, various control data, etc. in accordance with the protocols stipulated with the opposite communicating terminal equipment beforehand, and it delivers the demultiplexed data items to the G3-FAX modular jack 107, V11/RS422 multiconnector 106 and RS232C connector 105. Contrariwise, the multiplexor/demultiplexor 20 multiplexes the data to-be-multiplexed delivered from the G3-FAX modular jack 107, V11/RS422 multiconnector 106 and RS232C connector 105 and delivers the multiplexed data items to the multimedia multiplexing/demultiplexing and interterminal signal control unit 8.

In the case of holding a multipoint teleconference, the multipoint conversation control 7 performs controls required for the start and proceeding of the multipoint teleconference. In contrast, in the case of holding no multipoint teleconference, the control 7 merely relays data. The VDT 11 is means for detecting the feed voltage of the pertinent terminal equipment.

The camera 1 picks up a picture, which is presented as a display output by the LCD 2. The VSW 4 is a video switch which changes-over the connection of the picture codec 5 with the camera 1, LCD 2 and video I/O interface 110. The video input/output of an external video I/O device can be connected with the video I/O interface 110.

The picture codec 5 code a picture signal supplied through the VSW 4, and delivers the coded signal to the multimedia multiplexing/demultiplexing and interterminal signal control unit 8 through the multipoint conversation control 7. In addition, the picture codec 5 decodes the video data demultiplexed from the received communication frame by the control unit 8 and delivers an output through the VSW 4.

The hands-free set 14 is a microphone and a loudspeaker for freeing hands. The G3-FAX interface 16 is a modular jack to which a group 3 type facsimile can be connected. The audio input/output of an external audio I/O device can be connected to the audio I/O interface 109. An external microphone can be connected to the microphone input 108.

The ASW 13 is an audio switch which changes-over the connection of the audio codec 12 with the hands-free set 14, handset 15, G3-FAX interface 16, audio I/O interface 109 and microphone input 108.

The audio codec 12 codes a speech signal supplied through the ASW 13, and delivers the coded signal to the multimedia multiplexing/demultiplexing and interterminal signal control unit 8 through the multipoint conversation control 7. In addition, the audio codec 12 decodes the audio data demultiplexed from the received communication frame by the control unit 8 and delivers an output through the ASW 13. Incidentally, the audio codec 12 is connected to the V11/RS422 multiconnector 106 through the V11 D/R 17.

The dial function keys 3 are keys for accepting the instructions of a user. The telephone control man-machine interface 6 controls the ASW 13 in accordance with a key input from the dial function keys 3, so as to connect the audio codec 12 with the hands-free set 14, handset 15, G3-FAX interface 16 or microphone input 108. Besides, the instruction based on the key input is transferred to the multipoint conversation control 7 through the telephone control man-machine interface 6. In response to this instruction, the multipoint conversation control 7 controls the multipoint teleconference.

The G3-FAX interface 16 delivers a signal to-be-transmitted supplied from the G3 FAX (group 3 type facsimile) being an analog FAX connected to the G3-FAX connector 107, to the audio codec 12 through the ASW 13 in the case of treating the FAX data as audio data, while it digitizes the signal to-be-transmitted into a code and delivers the code to the data multiplexor/demultiplexor 20 in the case of treating the FAX data as data to-be-multiplexed. Contrariwise, when supplied with received data toward the G3 FAX by the audio codec 12, the G3-FAX interface 16 supplies the G3-FAX modular jack 107 with the received data as it is, and when supplied with received data toward the G3 FAX by the data multiplexor/demultiplexor 20, the G3-FAX interface 16 decodes the received data into an analog signal and delivers the analog signal to the G3-FAX modular jack 107.

The RS232C connector 105 serves as an RS232C interface, and it is a connector to which a computer, a word processor or an electronic blackboard can be connected. This RS232C connector 105 is connected to the control unit 26 or the data multiplexor/demultiplexor 20 through the bus SW 22. The communication interface matching section 21 matches the data rate of the input/output data of the data multiplexor/demultiplexor 20 with that of the input/output data of the RS232C interface 105. The communication ports 24 and 25 are ones which the control unit 26 uses in relation to the RS232C interface 105.

The V11/RS422 multiconnector 106 serves as a V11 interface and an RS422 interface, and it is a connector for connecting an external device. In this embodiment, an example in which a conference unit is connected will be described later.

The multiconnector 106 as the RS422 interface is connected to the control unit 26 through the bus SW 22. The communication port 23 is one which the control unit 26 uses in relation to the RS422 interface 106. The multiconnector 106 as the V11 interface is connected to the data multiplexor/demultiplexor 20.

In compliance with the commands of the control unit 26, the peripheral device control interfaces 27 and 28 control the various components in the teleconference terminal equipment, a mouse connected to the mouse jack 104, and a conferential console connected to the conference console connector 103. Also, they control an external device such as external camera through the camera control/external device multiconnector 101.

Incidentally, the camera control/external device multiconnector 101 transfers the command of the control unit 26 to the external device by means of the no-voltage contact 31.

The details of the picture codec 5 will be explained below.

FIG. 2 illustrates the construction of the picture codec 5.

Referring to the figure, the picture codec 5 includes an A/D (analog-to-digital) converter 200, a video coder 201, a still picture coder 202, a variable-length coder 203, a BCH (Bose-Chaudhuri-Hocquenghem code unit) 204, a PinP (picture-in-picture) processor 205, a video decoder 206, a D/A (digital-to-analog) converter 220, a still picture decoder 207, a variable-length decoder 208, a BCH 209, and video switches 210, 211, 212, 213, 214 and 215.

Thus, in this embodiment, a still picture and video are treated, but the signals thereof are digitized by the single A/D converter 200. This is based on the fact that the still picture and the video are not usually transmitted at the same time on account of the limited transmission capacity of a communication channel employed in a digital communications network. That is, in order to quickly send the still picture of large data quantity to the opposite communicating terminal equipment, the transmission of the video is usually suspended during that of the still picture.

Besides, in this embodiment, a still picture and video which have been received are displayed in a multiplexed state within an identical frame through the PinP processor 205 to be detailed later, thereby making it more convenient for use. Moreover, the still pictures and video are multiplexed into the identical frame before analogizing the signals of the respective pictures, whereby the single D/A converter 220 suffices for turning the picture data of both the pictures into analog signals.

Next, the operation of the picture codec 5 will be explained.

When supplied with a picture signal through the VSW 4, the A/D converter 200 converts the picture signal into a digital signal. Incidentally, although an NTSC signal is assumed as the picture signal to-be-input in this embodiment, even a signal conforming to another standard such as PAL or RGB can be similarly processed. The digitized picture data is transferred to the PinP processor 205 as the picture data of the pertinent terminal equipment itself.

Under the control of the peripheral device control interface 27, the video switches 210 and 211 deliver the digitized picture data to either the video coder 201 or the still picture coder 202, depending upon whether the input picture signal is for a still picture or video.

The video coder 201 codes the delivered picture data in accordance with code rules based on the DCT (discrete cosine transform) stipulated in CCITT Recommendation H. 261. Also, the still picture coder 202 codes the delivered picture data in accordance with predetermined code rules. When supplied with the coded picture data through the video switch 212 from either the video coder 201 or the still picture coder 202, the variable-length coder 203 turns the supplied image data into a variable-length code in accordance with variable-length code rules stipulated in CCITT Recommendation H. 261. When supplied with the variable-length code of the image data from the variable-length coder 203, the BCH 204 adds BCH data for error correction to the supplied code into video data and transfers the video data to the multimedia multiplexing/demultiplexing and interterminal signal control unit 8 through the multipoint conversation control 7.

On the other hand, when the BCH 209 is supplied with video data or still picture data through the multipoint conversation control 7 from the multimedia multiplexing/demultiplexing and interterminal signal control unit 8, it checks BCH data for error correction and delivers the error-corrected video data or still picture data to the variable-length decoder 208. This variable-length decoder 208 decodes the delivered picture data in accordance with the variable-length code rules stipulated in CCITT Recommendation H. 261. The data decoded by the variable-length decoder 208 is transferred to either the video decoder 206 or the still picture decoder 207 through the video switch 215, depending upon whether it is the video data or the still picture data. When supplied with the video data decoded by the variable-length decoder 208, the video decoder 206 decodes it in accordance with the code rules stipulated in CCITT Recommendation H. 261. Also, when supplied with the still picture data decoded by the variable-length decoder 208, the still picture decoder 207 decodes it is accordance with predetermined code rules such as code rules conforming to the JPEG (Joint Photographic Expert Group) algorithm of the ISO (International Organization of Standardization) Standard published March 1991. The picture data decoded by video decoder 206 or still picture decoder 207 is transferred as received motion picture data or received still picture data to the PinP processor 205 through the corresponding video switch 213 or 214.

If necessary, the PinP processor 205 performs a PinP process to be described later, by the use of the image data of the pertinent terminal equipment itself transferred from the A/D converter 200 and the image data decoded by the video decoder 206 or the still picture decoder 207, and it supplies the D/A converter 220 with the resulting image data which has been subjected to the PinP process. The D/A converter 220 converts the supplied image data into an analog signal, which is delivered to the video switch 4.

Then, the picture signal is presented as a display output on the LCD 2 or the like in accordance with the operation of the video switch 4.

Next, the details of the PinP processor 205 will be explained.

Figure 3:
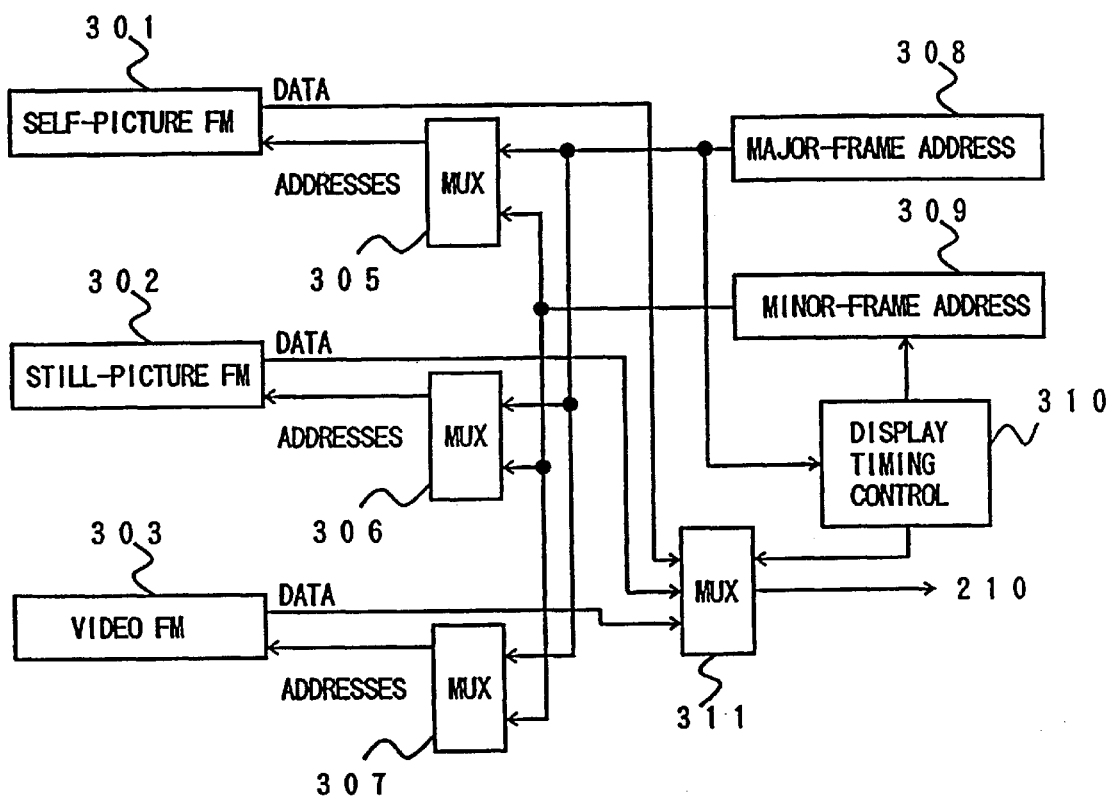
FIG. 3 is a block diagram showing the construction of a PinP (Picture in Picture) processor which is included in the teleconference terminal equipment of the first embodiment.
Figure 4A:
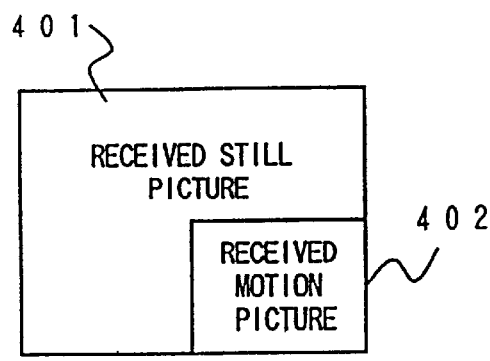
FIG. 4 is an explanatory diagram showing the aspects of a PinP process which is performed in the teleconference terminal equipment of the first embodiment.
Figure 4B:
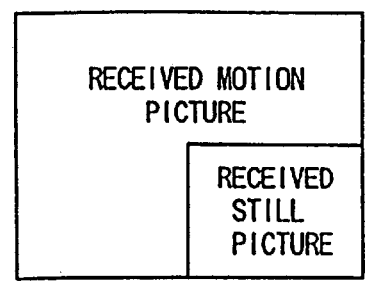
Figure 4C:
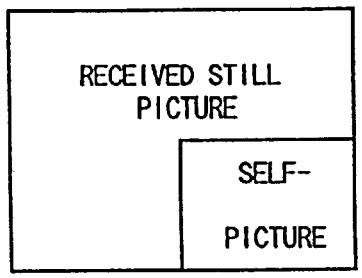
Figure 4D:
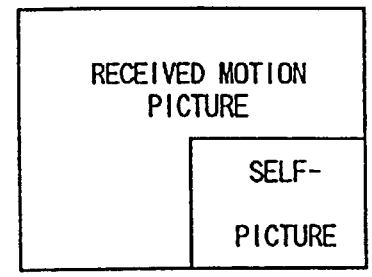
Figure 4E:
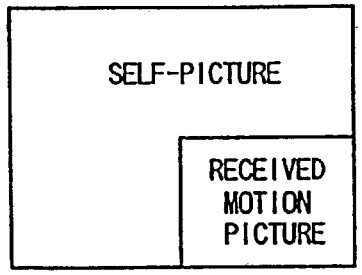
Figure 4F:
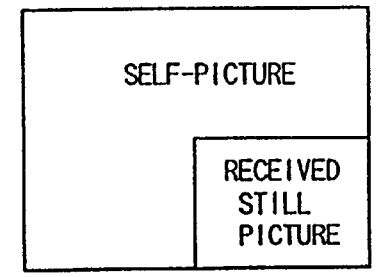

FIG. 3 illustrates the construction of the PinP processor 205.

Referring to the figure, the PinP processor 205 includes a self-picture frame memory 301, a still-picture frame memory 302, a video frame memory 303, MUX'es (multiplexors) 305, 306 and 307, a major-frame address generator 308, a minor-frame address generator 309, a display frame timing controller 310, and a MUX 311.

Next, the PinP process which is performed by the PinP processor 205 will be explained with reference to FIG. 4.

The "PinP process" is a process for producing a picture-in-picture frame from a plurality of pictures. That is, it is a process for multiplexing and outputting two picture data in order that different output pictures may be displayed in a major frame area and a minor frame area as illustrated in FIG. 4.

In this embodiment, the two picture data are selected from among the three picture data of the self-picture data transferred from the A/D converter 200, the received still picture data transferred from the still picture decoder 207 and the received motion picture data transferred from the video decoder 206, and they are multiplexed and output so as to be displayed in the major and minor frame areas. In the case where, in this manner, the PinP process is carried out by selecting two from the three picture data of the self-picture data, received still picture data and received motion picture data, six types of picture-in-picture frames can be produced as shown at symbols (a)~(f) in FIG. 4.

The PinP process of the PinP processor 205 proceeds as stated below.

The self-picture frame memory 301 stores the transferred self-picture data therein. The still-picture frame memory 302 stores the received still picture data therein. The video frame memory 303 stores the received motion picture data therein. The contents of the individual frame memories are sequentially updated.

The major-frame address generator 308 generates addresses for fetching the data of a picture to be displayed in the major frame area, in display sequence from the frame memory in which the picture data are stored. While the major-frame address generator 308 is generating the data addresses of the above picture corresponding to the major frame area, the minor-frame address generator 309 generates in parallel with the address generation of the generator 308, addresses for fetching the data of a picture to be displayed in the minor frame area, in display sequence from the frame memory in which the picture data are stored. On this occasion, the address generation timings of the minor-frame address generator 309 are controlled by the display timing controller 310. Besides, the picture to be displayed in the minor frame area must be reduced in size as shown in FIG. 4. Therefore, the minor-frame address generator 309 generates skipped addresses in accordance with a reduction rate so as to thin out pixels and then fetch the picture data from the frame memory.

Herein, the addresses generated by the major-frame address generator 308 are afforded through the corresponding MUX 305, 306 or 307 to the frame memory 301, 302 or 303 in which the picture data to be displayed in the major frame area are stored. Likewise, the addresses generated by the minor-frame address generator 309 are afforded through the corresponding MUX 305, 306 or 307 to the frame memory 301, 302 or 303 in which the picture data to be displayed in the minor frame area are stored.

While the minor-frame address generator 309 is generating the aforementioned addresses corresponding to the minor frame area, the MUX 311 selects and delivers the picture data fetched from the frame memory in which the picture data to be displayed in the minor frame area are stored. At any other time, the MUX 311 selects and delivers the picture data fetched from the frame memory in which the picture data to be displayed in the major frame area are stored. A change-over timing for these operation modes of the MUX 311 is controlled by the display timing controller 310.

Incidentally, the frame memories of the PinP processor 205 may well be shared for frame memories which the video coder 201, still picture coder 202, video decoder 206 and still picture decoder 207 use for the coding and the decoding.

Next, the details of the G3-FAX interface 16 will be explained.

Figure 5:
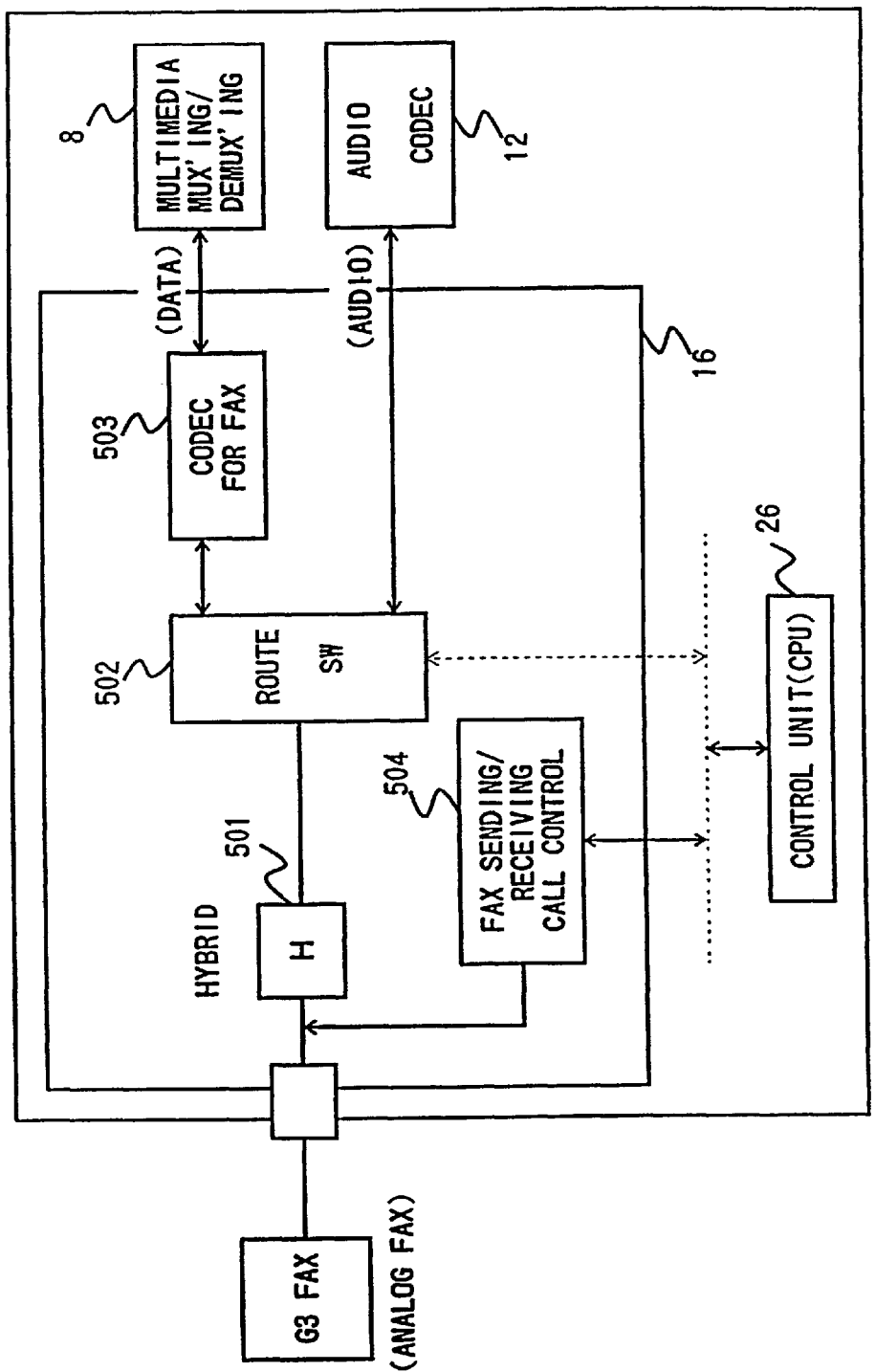
FIG. 5 is a block diagram showing the construction of a G3-FAX (group 3 type facsimile) interface which is included in the teleconference terminal equipment of the first embodiment.

FIG. 5 illustrates the construction of the G3-FAX interface 16.

Referring to the figure, the interface 16 includes a hybrid 501, a route SW (switch) 502, a codec 503 for the facsimile, and a FAX sending/receiving call control 504.

When the FAX sending/receiving call control 504 is informed of the reception of G3-FAX data through the peripheral device control interface 27 by the control unit 26, it applies a ringer signal to the G3-FAX modular jack 107. In addition, the FAX sending/receiving call control 504 detects the off-hook or on-hook condition of the G3 FAX connected with the G3-FAX modular jack 107 and reports the detected condition to the control unit 26 through the peripheral device control interface 27. Besides, if necessary, the control 504 reports the content of dialing in the G3 FAX connected with the G3-FAX modular jack 107, to the control unit 26 through the peripheral device control interface 27.

The hybrid 501 matches the half-duplex interface of the G3-FAX modular jack 107 with the full-duplex interface of the route SW side. In a case where the route SW 502 has been informed to the effect of treating the G3-FAX data as data to-be-multiplexed, through the peripheral device control interface 27 by the control unit 26, it connects the hybrid 501 to the audio codec 12. In consequence, the audio codec 12 codes the data sent by the connected G3 FAX and transfers the coded data as audio data to the multimedia multiplexing/demultiplexing and interterminal signal control unit 8 through the multipoint conversation control 7.

On the other hand, in a case where the route SW 502 has been informed to the effect of treating G3-FAX data as audio data, through the peripheral device control interface 27 by the control unit 26, it connects the hybrid 501 to the codec 503 for the FAX. The FAX codec 503 codes the sent data of the connected G3 FAX in accordance with the µ/A rules, the ADPCM or the like, and transfers the coded data as data to-be-multiplexed to the multimedia multiplexing/demultiplexing and interterminal signal control unit 8 through the data multiplexor/demultiplexor 20.

In this manner, according to this embodiment, the ordinary G3 FAX can be connected to the teleconference terminal equipment and then used without altering the interface thereof. Furthermore, the G3-FAX data is coded using the FAX codec 503 and then treated as the data to-be-multiplexed, whereby a telephone conversation is possible with the audio codec 12 even during communications with the G3 FAX.

Next, the camera control/external device multiconnector 101 will be explained.

The teleconference terminal equipment according to this embodiment can have an external camera, an external monitor, an external microphone/external loudspeaker, etc. connected thereto by the video I/O interface 110, the audio I/O interface 109, the microphone input 108, etc.

The camera control/external device multiconnector 101 is a connector for controlling the external camera as well as illumination therefor, and the external microphone among the aforementioned external I/O devices. The control employing this multiconnector 101 is realized in such a way that the control unit 26 controls the no-voltage contact such as the relay contact 31 in compliance with an instruction from the dial function keys 3, an instruction from the console connected to the conference console connector 103, or control data received from the opposite communicating terminal equipment and transferred through the multimedia multiplexing/demultiplexing and interterminal signal control unit 8. Incidentally, in the case stated before where the frame stipulated in CCITT Recommendation H. 221 is presumed as the communication frame, the control unit 26 receives the control data in the form of the FAS, BAS or MLP data from the opposite communicating terminal equipment and controls the no-voltage contact 31 in accordance with the received control data.

Figure 6:
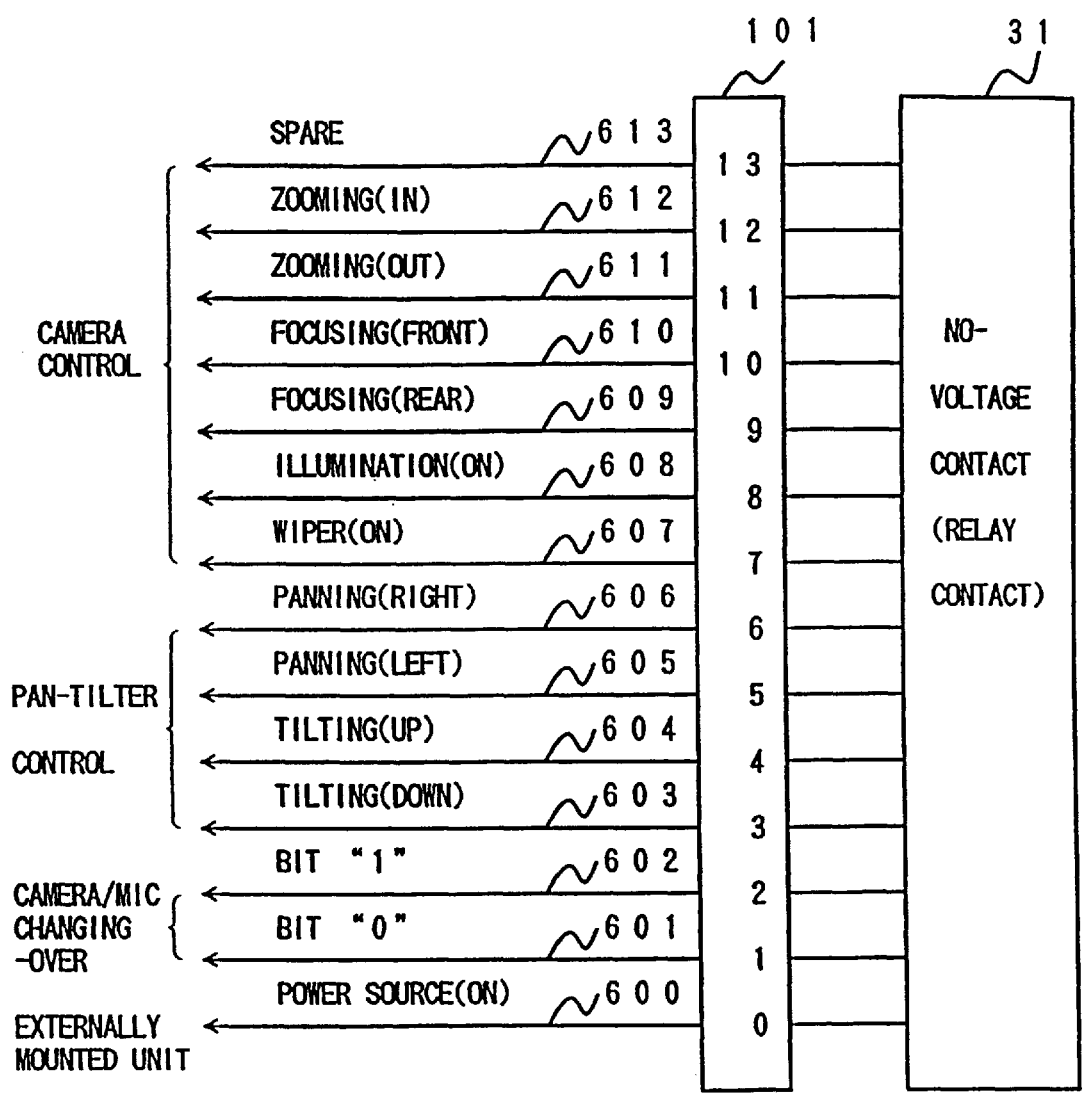
FIG. 6 is an explanatory diagram showing the construction of a camera control/external device multiconnector which is included in the teleconference terminal equipment of the first embodiment.

FIG. 6 illustrates the construction of the camera control/external device multiconnector 101. As shown in the figure, the multiconnector 101 contains the signals of spare 613; zooming 612, 611; focusing 610, 609; illumination 608; wiper 607; panning 606, 605; tilting 604, 603; camera/microphone changing-over 602, 601; and power source 600.

Using these signals, the control unit 26 can control the zooming and focusing of the external camera, and the illumination, a wiper, and panning and tilting for the external camera, through the camera control/external device multiconnector 101. Also, it can control the change-over between the camera and the microphone, and the turn-ON/OFF of the power source of any desired external device through the multiconnector 101.

Next, the V11/RS422 multiconnector 106 will be explained.

The V11/RS422 multiconnector 106 is a connector which includes a V11 interface and an RS422 interface.

In this embodiment, it is assumed that the conference unit to be described later is connected to the V11/RS422 multiconnector 106.

The RS422 interface within the V11/RS422 multiconnector 106 is connected with the control unit 26 through the communication port 23. The control unit 26 transfers control data to and from the conference unit by the use of the RS422 interface.

The V11 interface within the V11/RS422 multiconnector 106 is connected to the data multiplexor/demultiplexor 20 and the audio codec 12. On the basis of the control of the control unit 26, the data multiplexor/demultiplexor 20 demultiplexes control data and data to-be-demultiplexed supplied from the multimedia multiplexing/demultiplexing and interterminal signal control unit 8, and it delivers the resulting data to the V11 interface. Contrariwise, the data multiplexor/demultiplexor 20 multiplexes control data and data to-be-multiplexed delivered from the V11 interface, with FAX data etc. delivered from the G3-FAX interface 16, and it supplies the resulting data to the multimedia multiplexing/demultiplexing and interterminal signal control unit 8. Incidentally, in the case of employing the aforementioned H. 221 frame as the communication frame, MPL data can be used as the control data.

Herein, the data which is delivered from the data multiplexor/demultiplexor 20 to the V11 interface is in the form of the actual burst data demultiplexed and extracted from the communication frame. Likewise, the data which is delivered from the V11 interface to the data multiplexor/demultiplexor 20 is burst data having the same transfer rate as that of data contained in the communication frame.

As stated above, in this embodiment, the data area and control data area of the communication frame can be opened to the exterior as they are. Accordingly, the V11 interface can freely utilize the predetermined data area or control data area contained in the communication frame.

Figure 7:
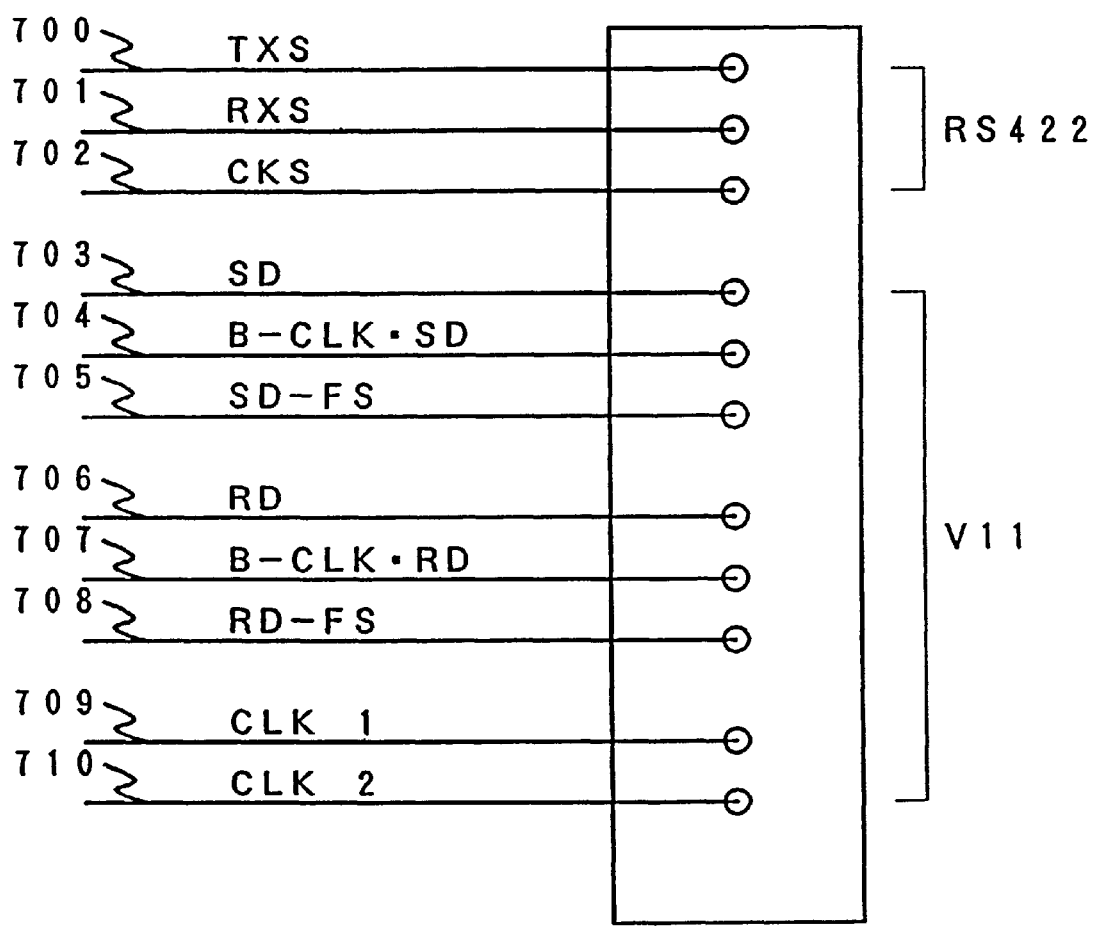
FIG. 7 is an explanatory diagram showing the construction of a V11/RS422 multiconnector which is included in the teleconference terminal equipment of the first embodiment.

Here, FIG. 7 illustrates the construction of the V11/RS422 multiconnector 106.

Referring to the figure, parts 700~702 constitute the RS422 interface, and parts 703~710 the V11 interface.

The RS422 interface includes the lines of transmission data 700, reception data 701 and a transfer clock 702. The V11 interface includes the lines of sending data 703, a sending burst clock 704 synchronized with sending burst data, a sending frame sink 705, receiving data 706, a receiving burst clock 707 synchronized with receiving burst data, a receiving frame sink 708, and two types of basic clocks 709, 710.

Figure 8B:
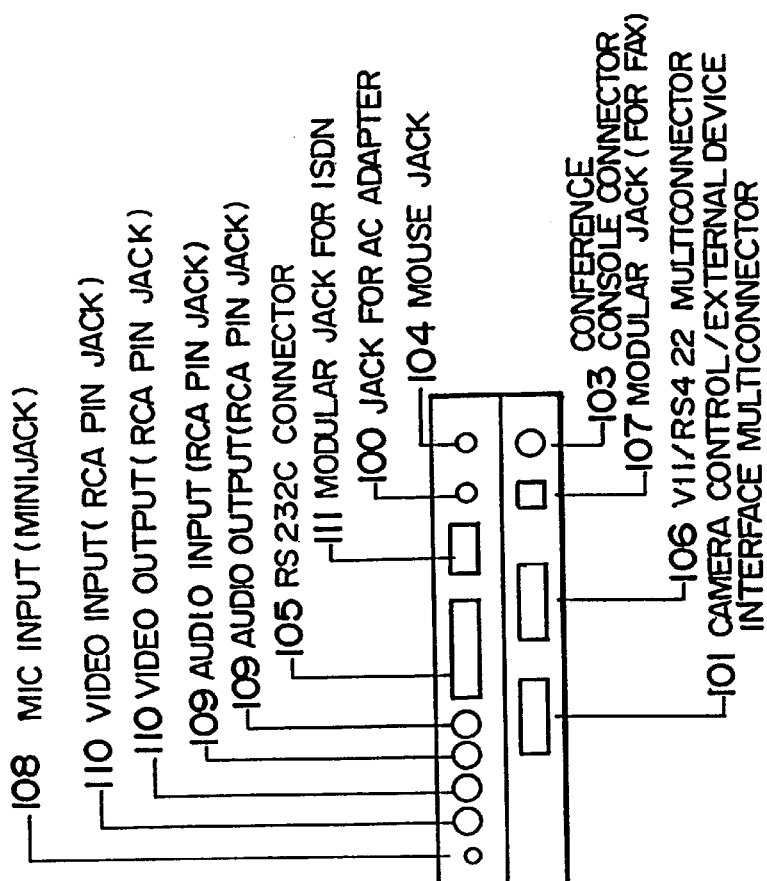
FIGS. 8(*a*) and 8(*b*) are a perspective view and a rear view, respectively, showing the external appearance of the teleconference terminal equipment of the first embodiment.
Figure 8A:
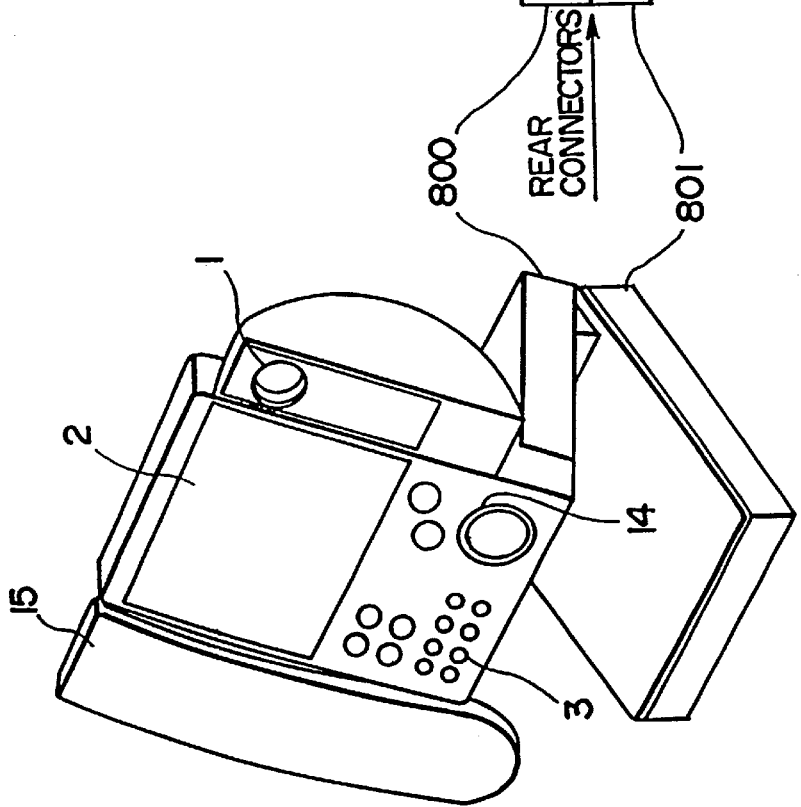

Next, the external appearance of the teleconference terminal equipment according to this embodiment are illustrated in FIGS. 8(*a*) and 8(*b*).

FIG. 8(*a*) is a perspective view of the terminal equipment seen obliquely from the front thereof, while FIG. 8(*b*) is a rear view of the essential portions thereof showing the arrangement of connectors.

Now, the constructions of teleconference systems each of which employs the teleconference terminal equipment according to this embodiment will be described with reference to FIG. 9 thru FIG. 13. In these figures, numeral 1000 indicates the teleconference terminal equipment.

Figure 9:
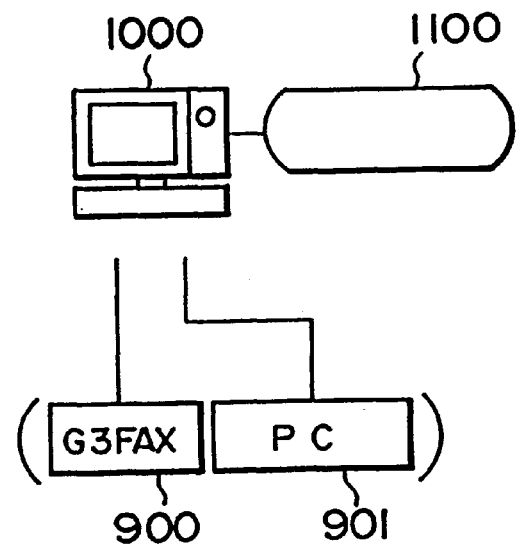
FIG. 9 is a block diagram showing an example of the construction of a teleconference system according to the first embodiment of the present invention.
Figure 10:
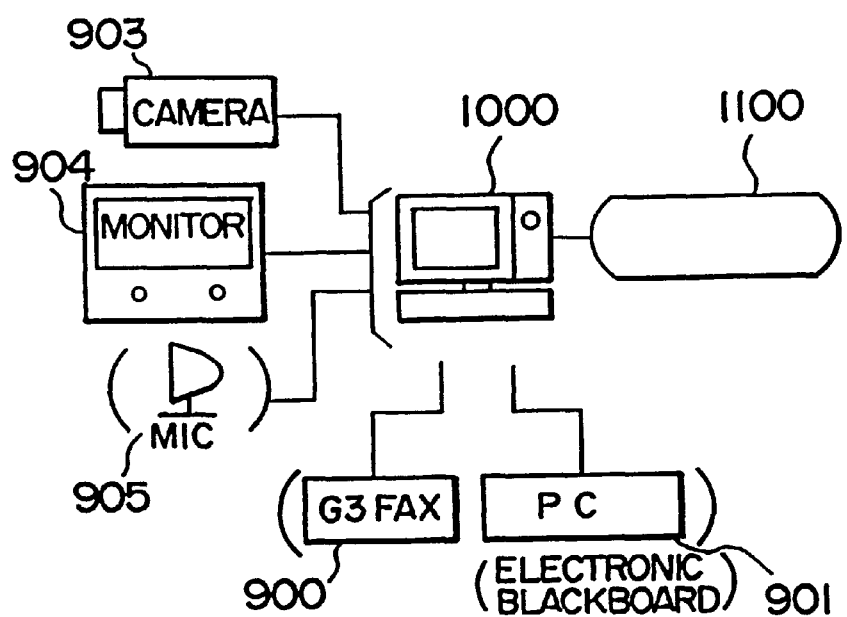
FIG. 10 is a block diagram showing another example of the construction of the teleconference system of the first embodiment.
Figure 11:
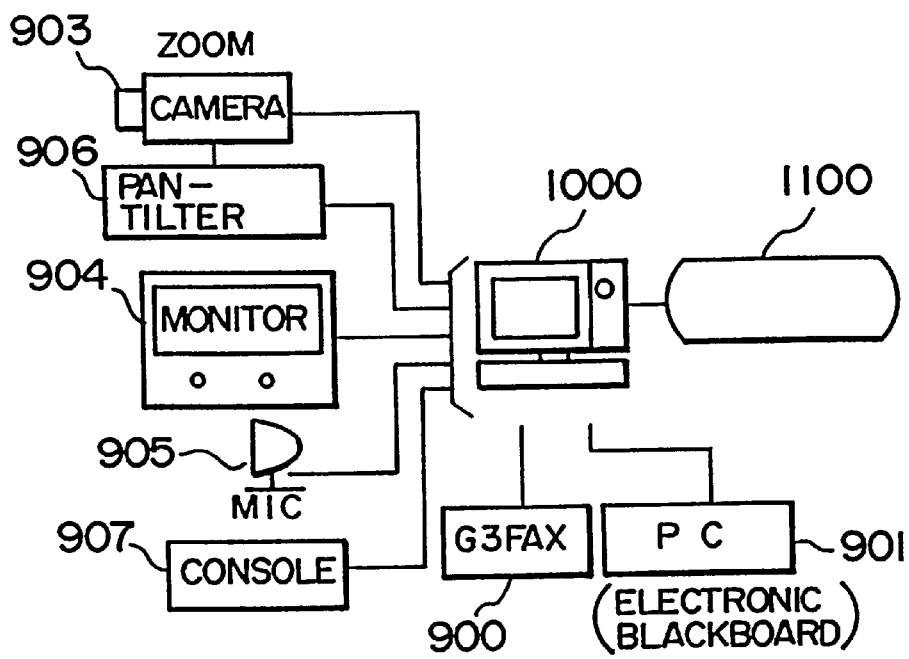
FIG. 11 is a block diagram showing still another example of the construction of the teleconference system of the first embodiment.
Figure 12:
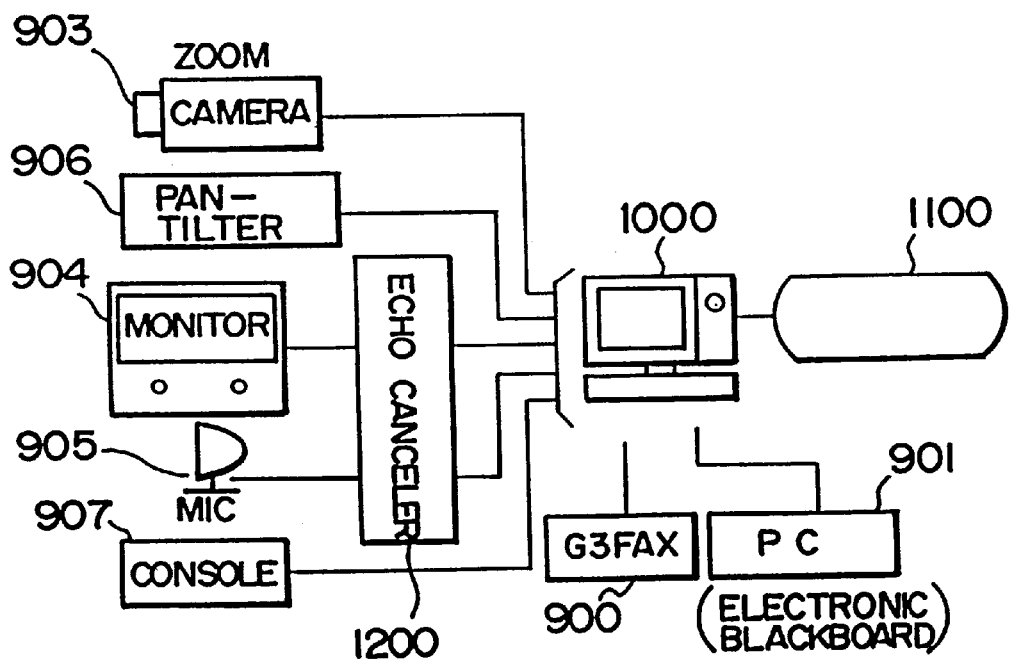
FIG. 12 is a block diagram showing yet another example of the construction of the teleconference system of the first embodiment.
Figure 13:
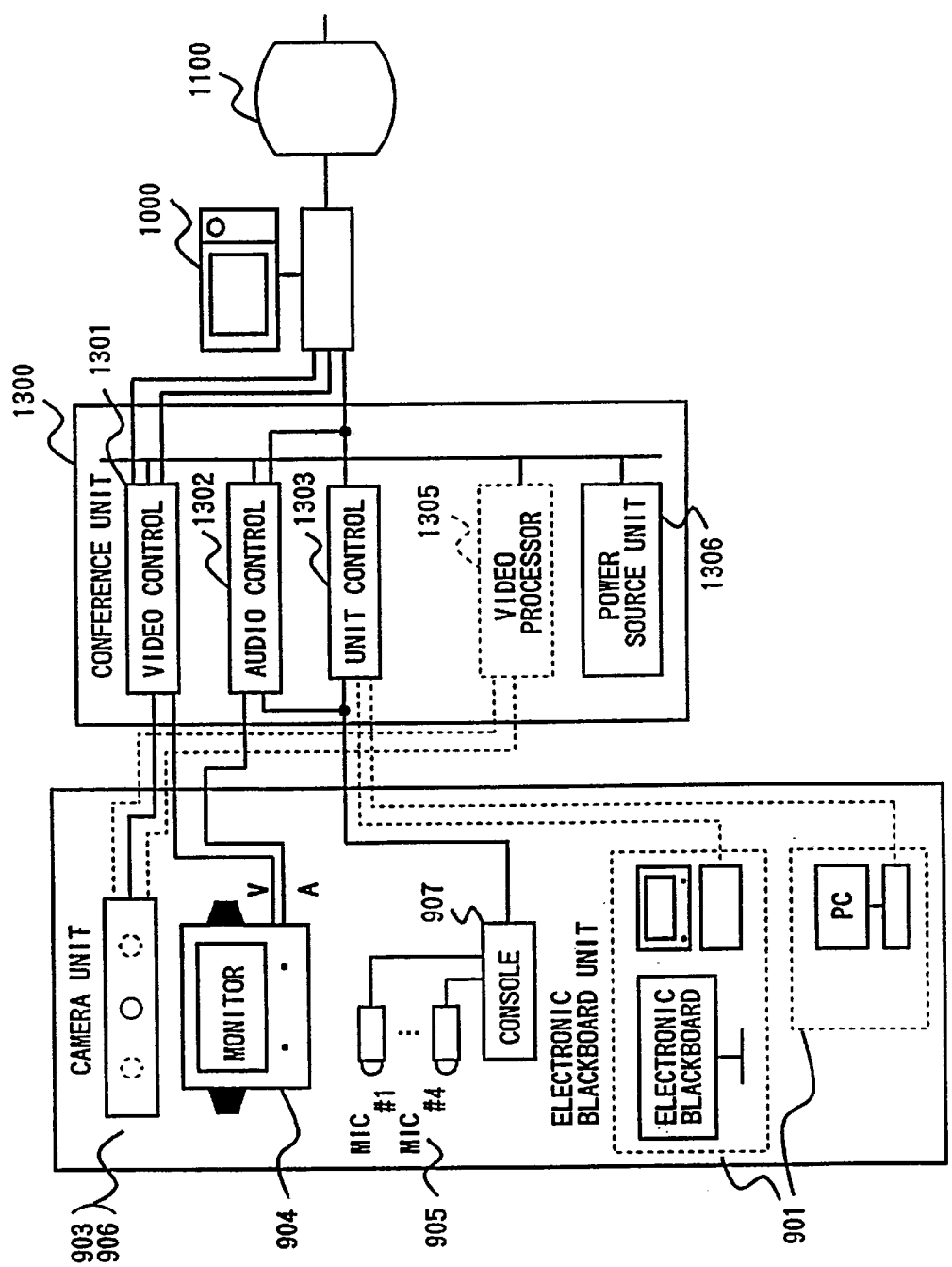
FIG. 13 is a block diagram showing a further example of the construction of the teleconference system of the first embodiment.

FIG. 9 shows the teleconference system which is suitable for the personal telephonic communications between one person and another, FIG. 10 shows the teleconference system which is suitable for a teleconference among a small number of people, FIG. 11 shows the teleconference system of simplified type which is used for a teleconference, FIG. 12 shows the teleconference system which is suitable for a regular teleconference, and FIG. 13 shows the teleconference system which is suitable for a larger teleconference.

As seen from the figures, according to the teleconference systems in this embodiment, a G3 FAX 900, a computer 901 such as a personal computer or word processor, a camera 903, a monitor 904, a microphone 905, a camera pan-tilter 906, a conference console 907, etc. can be connected by the video I/O interface 110, audio I/O interface 109, microphone input 108, G3-FAX modular jack 107, V11/RS422 multiconnector 106, RS232C connector 105, mouse jack 104, conference console connector 103, and camera control/ external device multiconnector 101. Thus, the teleconference systems can be flexibly constructed in accordance with intended uses.

In particular, according to the teleconference system in this embodiment, the external interface based on the digital data of the audio codec 12 is included in the V11/R422 multiconnector 106 as stated before. As shown in FIG. 12, therefore, a digital echo canceler 1200 of high performance can be disposed outside if it is need.

As shown in FIG. 13, a G3 FAX 900, data processing devices 901 such as a personal computer or word processor and an electronic blackboard, a camera 903, a monitor 904, microphones 905, a camera pan-tilter 906, a conference console 907, etc. may well be connected through a conference unit 1300 so as to realize higher degrees of conference functions.

As shown in FIG. 13, the conference unit 1300 includes a video controller 1301, an audio controller 1302, a unit controller 1303, a video processor 1305 and a power source unit 1306. The video controller 1301 is connected to the video I/O interface 110 of the teleconference system. The audio controller 1302, unit controller 1303 and video processor 1305 are connected with the V11/RS422 multiconnector 106 of the teleconference system through the unshown data interface unit thereof.

The unit controller 1303 controls any of the constituents of the conference unit 1300 in compliance with an instruction from the conference console 907, an instruction from the control unit 26 of the teleconference system as delivered through the RS422 interface, or control data received through the V11 interface from the opposite communicating terminal equipment. In addition, the unit controller 1303 transfers data received through the V11 interface from the opposite communicating terminal equipment, between this V11 interface and the data processing devices 901 such as the personal computer or word processor and the electronic blackboard.

The video controller 1301 and the still picture processor control the change-over between the camera and the monitor, for example, which are connected to the video I/O interface 110 of the teleconference system. The audio controller 1302 controls the change-over between the microphone and the loudspeaker, for example, which are connected to the audio codec 12 of the teleconference system through the V11 interface. In addition, the audio controller 1302 performs an echo canceling process as may be needed. The video processor 1305 performs the control of the camera pan-tilter 906.

In this manner, according to the teleconference system of this embodiment, the pertinent terminal equipment can communicate with the conference unit connected to the opposite communicating terminal equipment through the mutual direct controls which are performed by the use of the data area and the control data area opened to the external devices as stated before.

As thus far described, according to the first embodiment, it is possible to provide the teleconference system in which the still picture and the video can be simultaneously displayed on the single screen.

Now, the second embodiment of a teleconference terminal equipment according to the present invention will be described.

Figure 14:
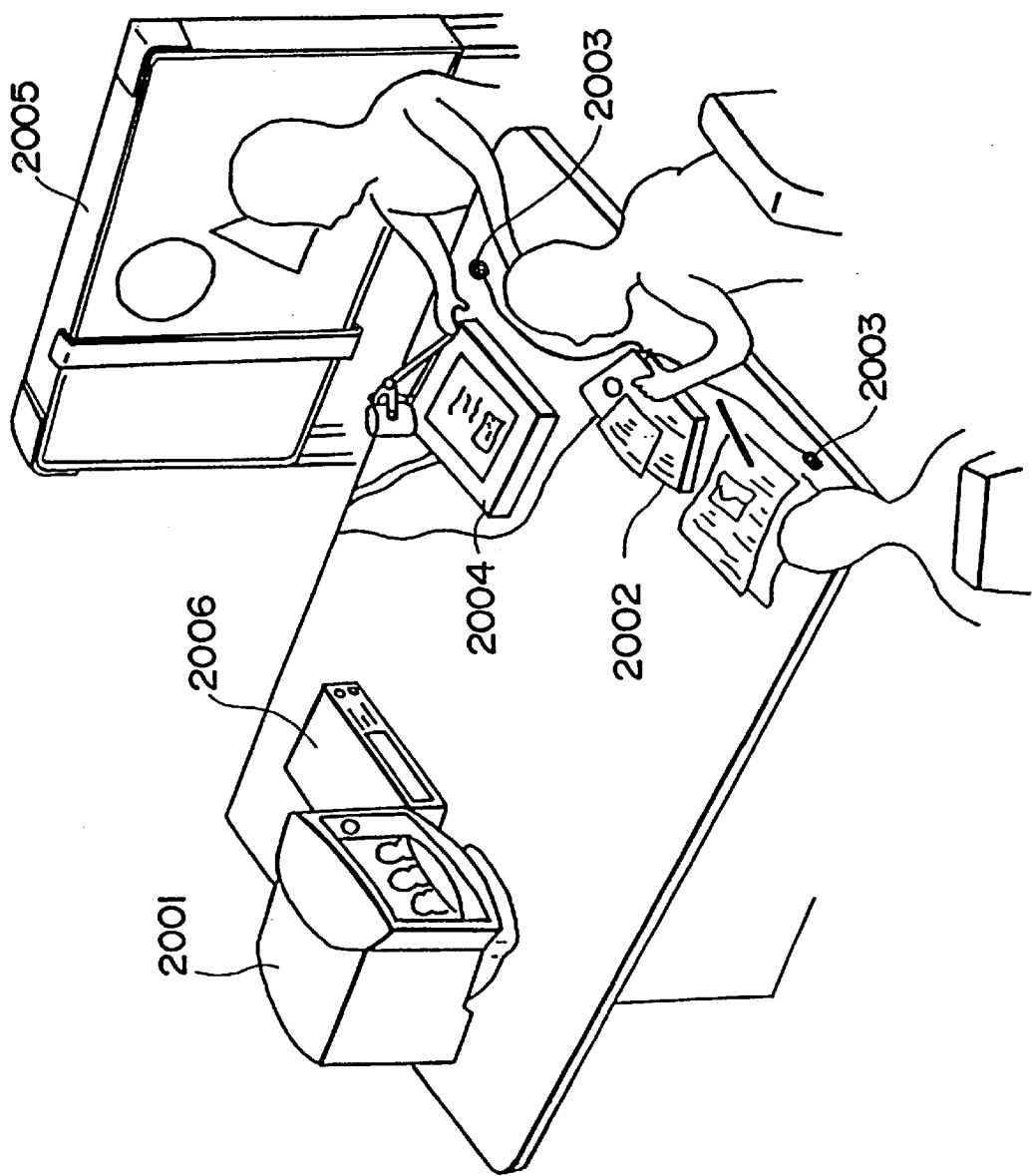
FIG. 14 is an explanatory view showing the construction and service situation of a teleconference system according to the second embodiment of the present invention.

First, FIG. 14 illustrates the construction of a teleconference system which employs the teleconference terminal equipment according to this embodiment.

Referring to the figure, the embodiment includes the teleconference terminal equipment 2001 connected to a digital communications network, a control keyboard 2002, microphones 2003, a document photographing stand 2004, an electronic blackboard 2005 and a video tape recorder 2006.

The illustrated teleconference system is fundamentally configured of the teleconference terminal equipment 2001, the control keyboard 2002 connected to the teleconference terminal equipment 2001, and the microphones 2003 connected to the teleconference terminal equipment 2001 through the control keyboard 2002. If necessary, the system is additionally furnished with the document photographing stand 2004, electronic blackboard 2005 and video tape recorder 2006 by connecting them to the teleconference terminal equipment 2001. Besides, as will be described later, a facsimile machine and a small-sized computer can be connected to the teleconference terminal equipment 2001 as required.

As shown in the figure, the teleconference system of this embodiment features the desktop type teleconference terminal equipment 2001. Owing to the desktop type construction, when the teleconference terminal equipment 2001 is carried in with the control keyboard 2002 and the microphones 2003, a teleconference can be held in an ordinary conference room or by the use of a mere conference desk.

The teleconference terminal equipment 2001 will now be explained.

Figure 15:
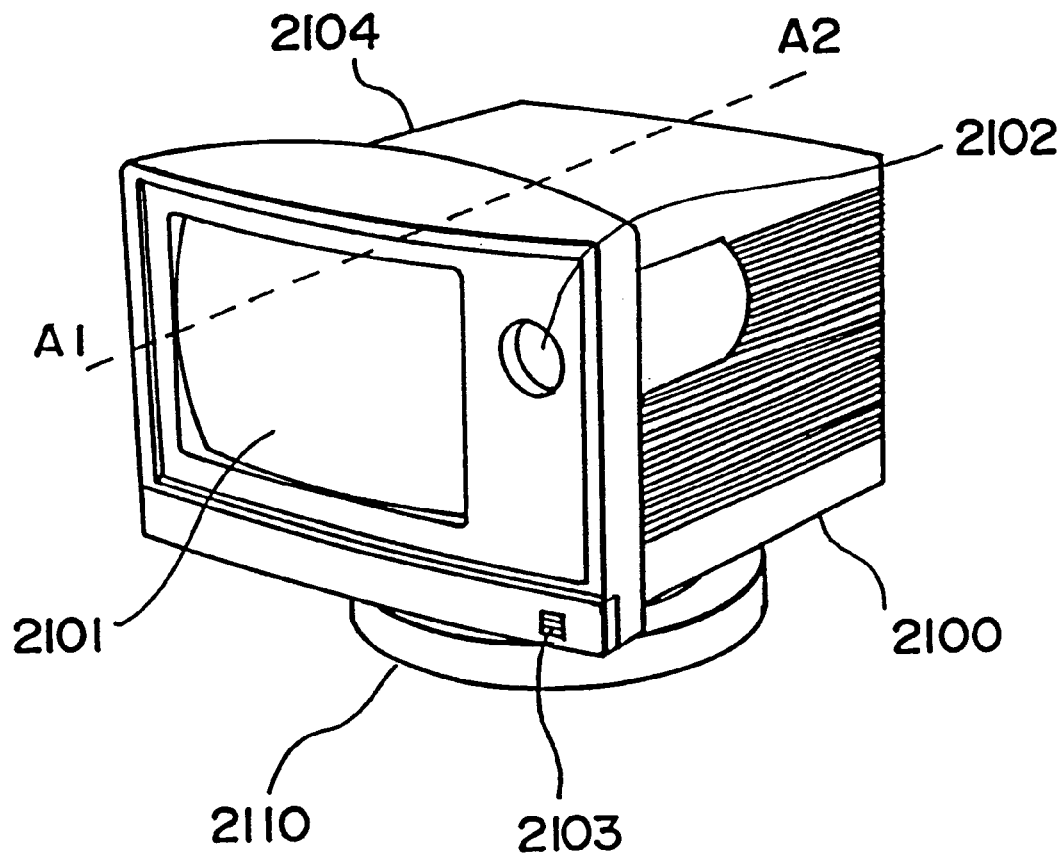
FIG. 15 is an exterior view showing the construction of the first teleconference terminal equipment according to the second embodiment of the present invention.

FIG. 15 illustrates the external appearance of the teleconference terminal equipment 2001 according to this embodiment. Referring to the figure, numeral 2100 indicates the body of the terminal equipment 2001, numeral 2101 a monitor employing a cathode-ray tube 11 inches in size, numeral 2102 a camera window, numeral 2103 a ringer speaker, and numeral 2110 a base. Although not seen in the figure, a speaker window (for a loudspeaker 2104) is provided on the left side of the body 2100, and various terminals are provided on the rear surface thereof. A built-in camera is disposed behind the camera window 2102.

Figure 16B:
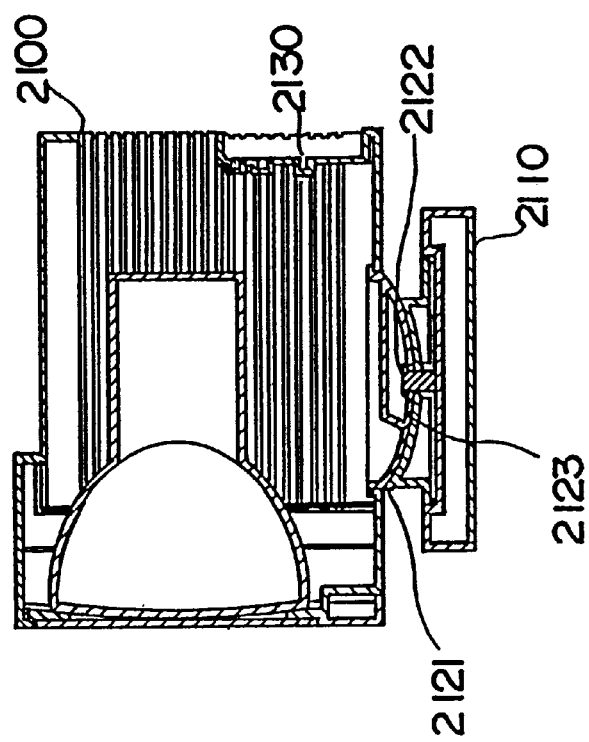
FIGS. 16A and 16B are a side view and a sectional view, respectively, of the first teleconference terminal equipment of the second embodiment.
Figure 16A:
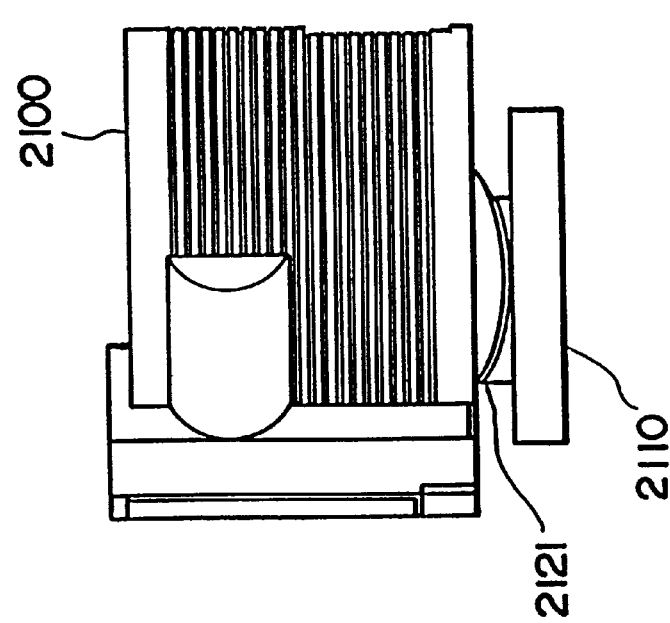

Next, FIG. 16A is a side view of the teleconference terminal equipment 2001, while FIG. 16B is a sectional view thereof taken along line A1–A2 in FIG. 15. Here, mechanisms inside the body 2100 are omitted from the illustrations.

As shown in FIGS. 16A and 16B, the body 2100 and the base 2110 are connected by a tilt and swivel mechanism 2121, so that the body 2100 is turnable relative to the base 2110 through predetermined angles in the vertical and horizontal directions. That is, the body 2100 is turnable about an arbor 2122 through the predetermined angle in the horizontal direction, and it is turnable along a slot 2123 through the predetermined angle in the vertical direction. Incidentally, numeral 2130 denotes a terminal area where the various input/output terminals are disposed.

In this embodiment, the camera includes a wide-angle lens of 57°. By employing the wide-angle lens for the camera in this manner, a plurality of users can be simultaneously photographed even when they are a short distance away. Accordingly, a plurality of conferees at a conference desk on each communicating side, for example, can hold a teleconference merely by putting the teleconference terminal equipment 2001 on one end of the conference desk. Incidentally, in this embodiment, it is assumed as standard that several conferees will utilize the teleconference terminal equipment 2001 having the 11-inch monitor 2101, at a position which is about 1.5 meters remote from this teleconference terminal equipment. Thus, the wide-angle lens is set at 57° so that a horizontal width of 1.5 meters can be photographed at the aforementioned position. The wide-angle lens, however, may well be set at any suitable angle, depending upon the size of the screen of the monitor and the service conditions of the teleconference terminal equipment. In general, an angle of about 60° will be desirable.

Meanwhile, the control keyboard 2002 should preferably be provided separately from the teleconference terminal equipment 2001 to enable the smooth progress of the conference. Alternatively, however, a control keyboard may well be provided unitarily with a teleconference terminal equipment.

Figure 17B:
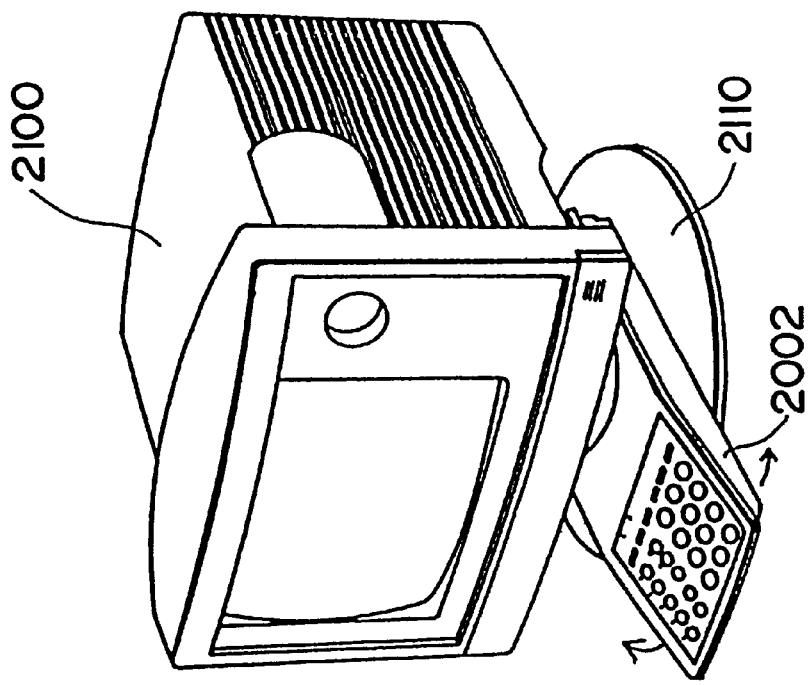
FIGS. 17A and 17B are exterior views showing the construction of the second teleconference terminal equipment according to the second embodiment of the present invention.
Figure 17A:
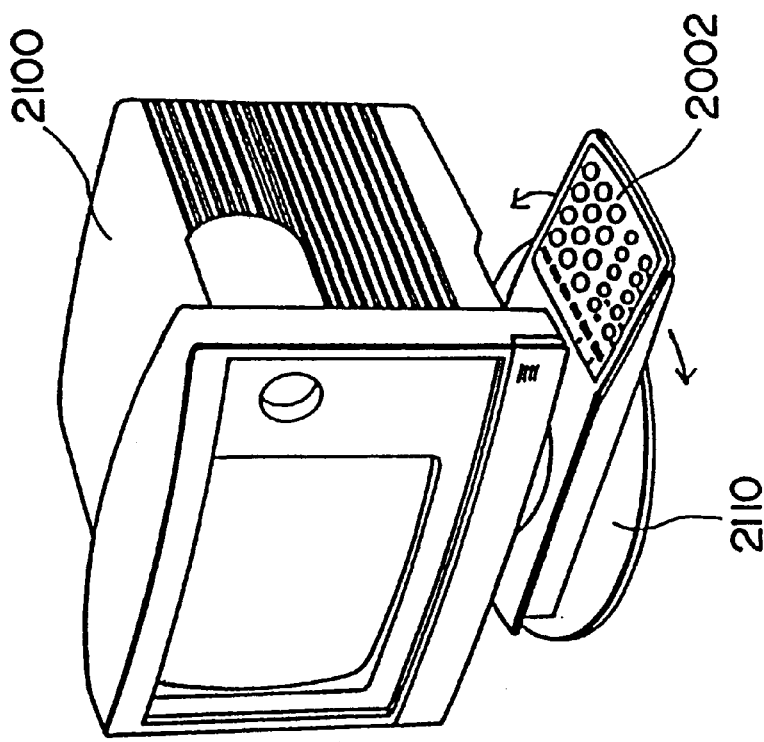

By way of example, FIGS. 17A and 17B illustrate the external appearance of the teleconference terminal equipment which is unitarily provided with the control keyboard 2002.

Figure 18B:
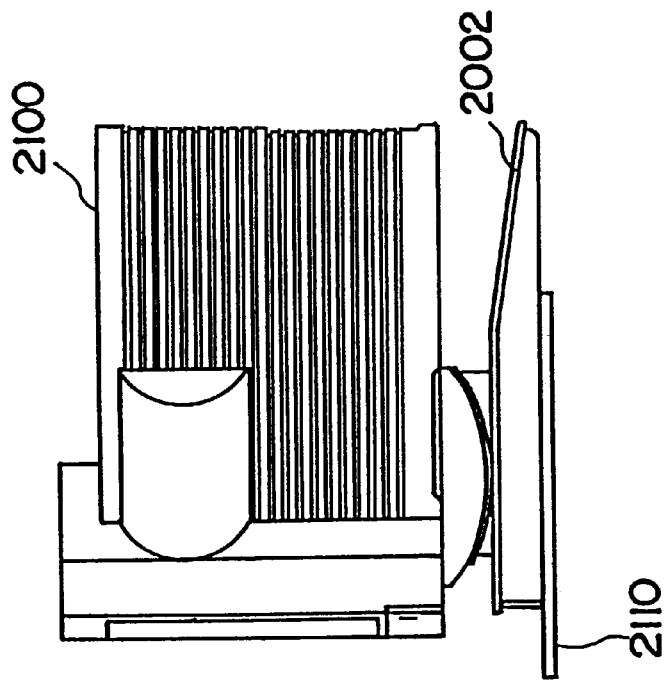
FIGS. 18A and 18B are a sectional view and a side view, respectively, of the second teleconference terminal equipment of the second embodiment.
Figure 18A:
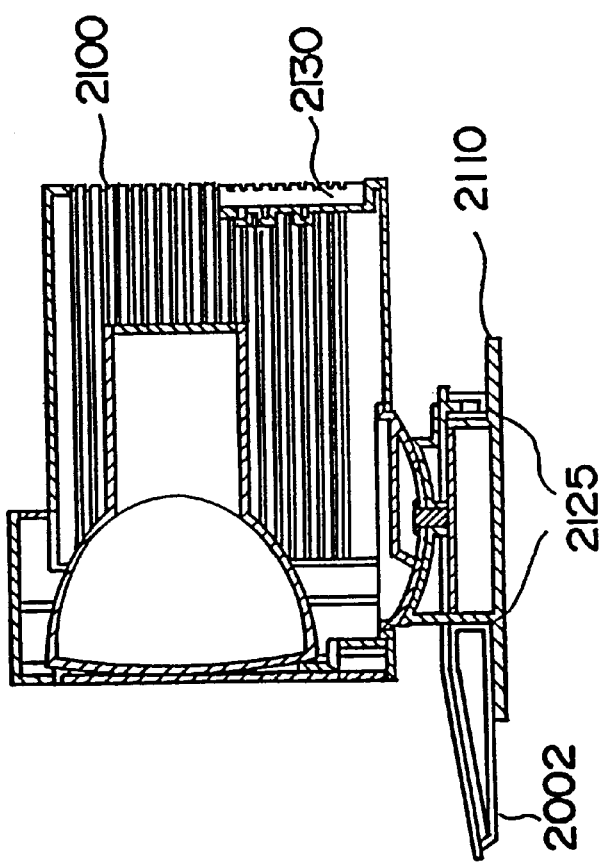

As shown in the figures, in this example, the control keyboard 2002 is mounted on the base 2110 between the body 2100 and this base. Besides, as shown in FIG. 18A, this control keyboard 2002 is mounted on the base 2110 by a turning mechanism 2125. Accordingly, it can be housed under the body 2100 as shown in FIG. 18B while the terminal equipment is not used. Moreover, with such a turnable control keyboard, each of the conferees is easily able to operate the control keyboard during the use of the terminal equipment.

Although the camera is arranged by the side of the cathode-ray tube in each of the foregoing teleconference terminal equipments of the second embodiment, it may well be arranged above the cathode-ray tube.

Figure 19:
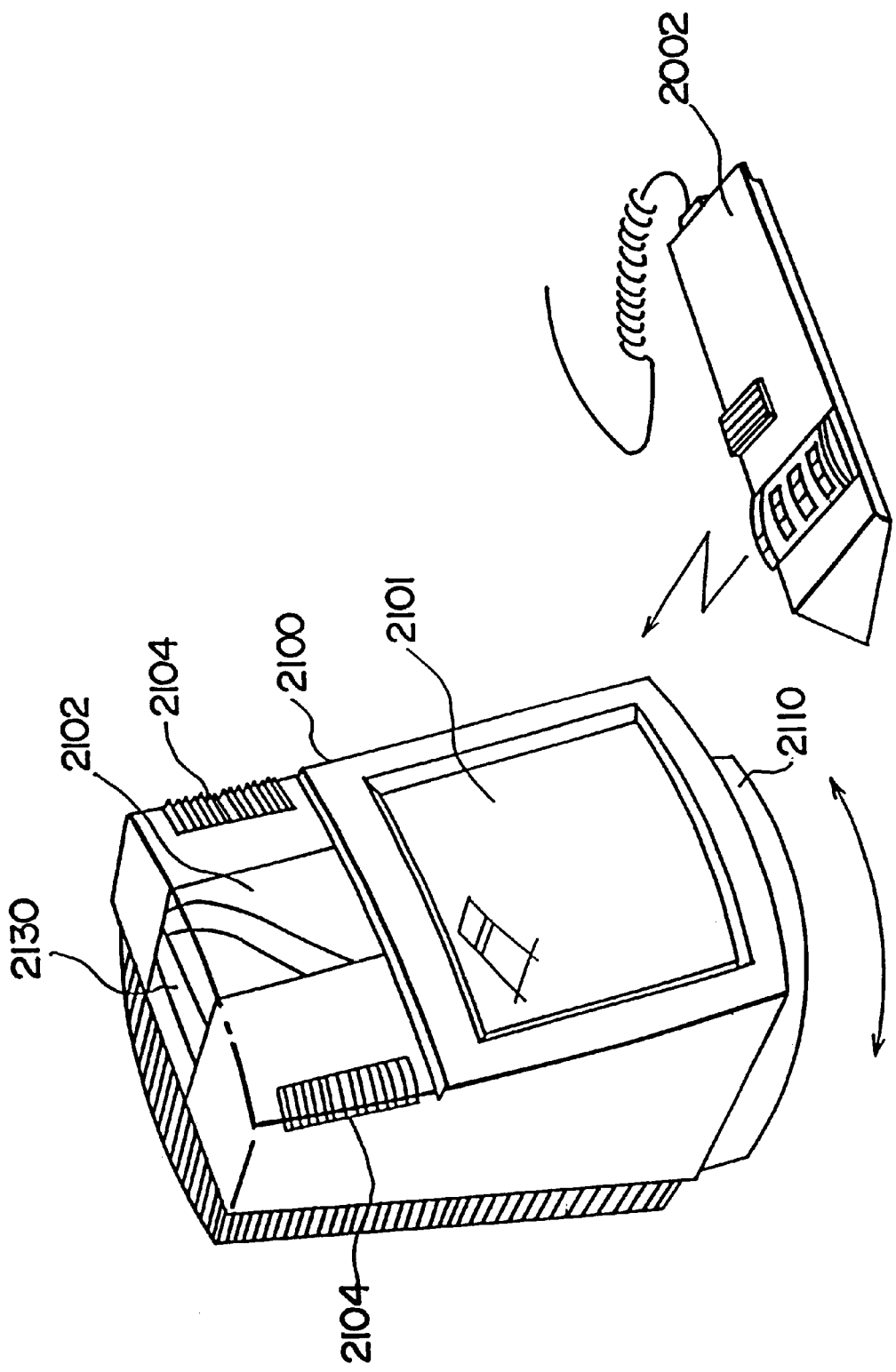
FIG. 19 is an exterior view showing the construction of the third teleconference terminal equipment according to the second embodiment of the present invention.

By way of example, FIG. 19 illustrates the external appearance of a teleconference terminal equipment in which the camera is arranged above the cathode-ray tube 2101.

Referring to the figure, numeral 2102 indicates a camera window, behind which the camera is installed. Numeral 2130 indicates a drawer type handle which is attached in order to facilitate carrying the teleconference terminal equipment. In this example, loudspeakers 2104 are arranged in the front of the teleconference terminal equipment. Also in this example, the body 2100 and the base 2110 are connected by a turning mechanism, whereby the teleconference terminal equipment can be freely positioned in the horizontal direction. Incidentally, the teleconference terminal equipment of this example can be operated through a wireless remote control from the control keyboard 2002.

Figure 20A:
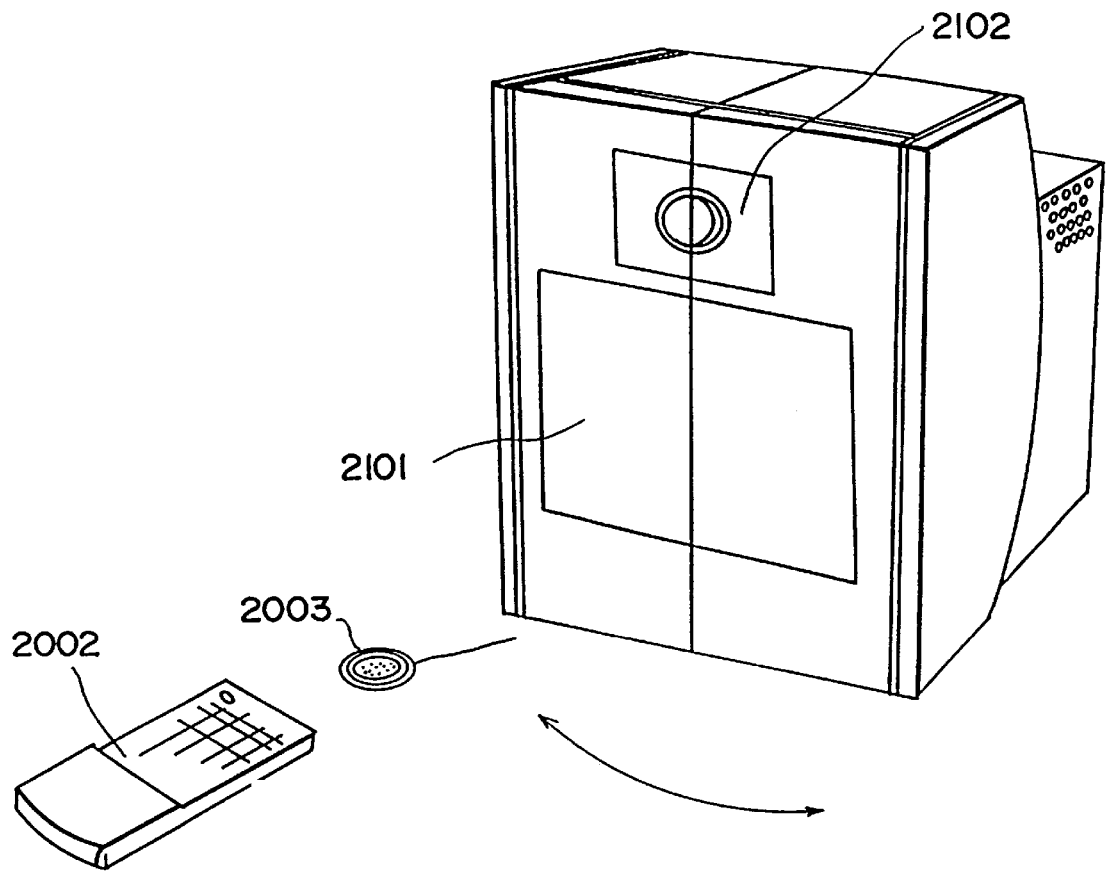
FIGS. 20A and 20B are an exterior view and an explanatory view, respectively, showing the construction of the fourth teleconference terminal equipment according to the second embodiment of the present invention.
Figure 20B:
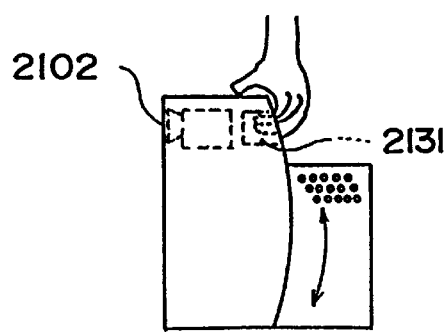

Next, FIGS. 20A and 20B illustrate another example of the teleconference terminal equipment in which the camera is arranged above the cathode-ray tube 2101.

As clearly shown in FIG. 20B, the depthwise dimension of the camera arranged behind the camera window 2102 is short compared with that of the cathode-ray tube 2101. This fact is utilized herein the example, and the part of the teleconference terminal equipment behind the camera window 2102 is shortened to form a carrying handle 2131.

Now, the internal construction of the teleconference terminal equipment 2001 will be explained.

Figure 21:
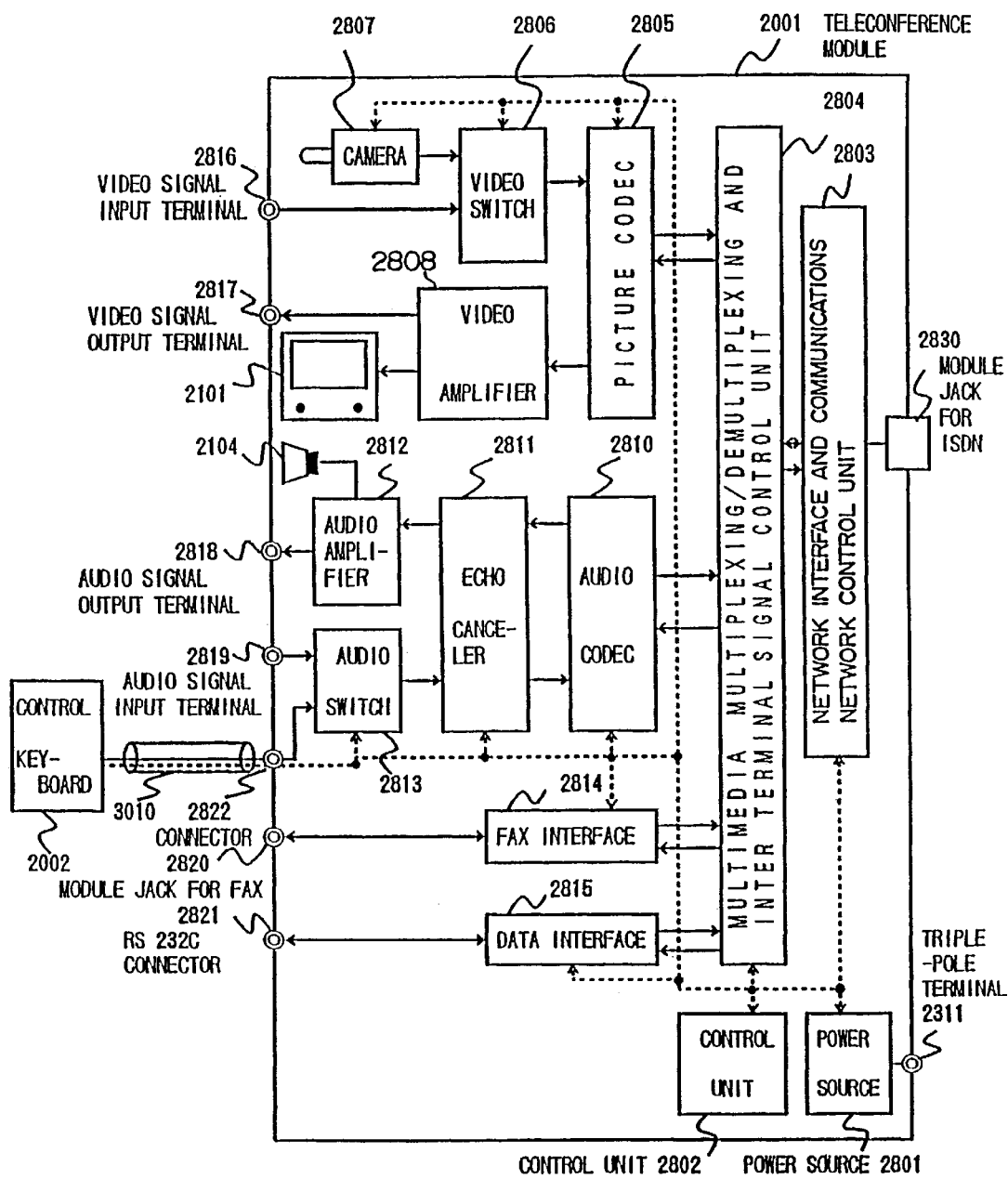
FIG. 21 is a block diagram showing the internal construction of the teleconference terminal equipment of the second embodiment.

FIG. 21 shows the internal construction of this teleconference terminal equipment. As shown in the figure, the internal construction of the teleconference terminal equipment according to the second embodiment is substantially the same as that of the teleconference terminal equipment according to the first embodiment described with reference to FIG. 1 before.

Referring to the figure, numeral 2830 indicates a terminal which is to be connected to the digital communications network. In this embodiment, the digital communications network is assumed to be the ISDN (integrated service digital network), and the terminal 2830 to be a modular jack having eight pins. Besides, the teleconference terminal equipment 2001 includes the camera 2807, the monitor 2101, the loudspeaker 2104, a video switch 2806, a video amplifier 2808, a picture codec 2805, a multimedia multiplexing/demultiplexing and interterminal signal control unit 2804, a network interface and communications network control unit 2803, an audio codec 2810, an echo canceler 2811, an audio switch 2813, an audio amplifier 2812, a FAX interface 2814, a data interface 2815, a control unit 2802 and a power source 2801.

Included as the external I/O terminals are video I/O interfaces 2816 and 2817, audio I/O interfaces 2818 and 2819, a modular jack 2820 for a G3 FAX (group 3 facsimile), an RS232C connector 2821, and a connector 2822 for the control keyboard 2002. These connectors and the above terminal 2830 are arranged on the rear surface of the teleconference terminal equipment 2001 (refer to FIG. 15).

Herein, the network interface and communications network control unit 2803 is connected to the ISDN through the connector 2830, and it performs the communication controls and communication processing between the pertinent teleconference terminal equipment and the network, such as establishing a communication channel with the opposite communicating terminal equipment. The multimedia multiplexing/demultiplexing and interterminal signal control unit 2804 performs various controls between the pertinent terminal equipment and the opposite terminal equipment. Besides, this control unit 2804 demultiplexes video data, audio data, data to be multiplexed/demultiplexed, control data, etc. from within a received communication frame into the individual data types, and it multiplexes such types of data into a transmission communication frame. The video data mentioned above is interface data on the network side of the picture codec 2805, while the audio data is interface data on the network side of the audio codec 2810. The data to be multiplexed/demultiplexed is interface data with respect to the data interface 2815 and the FAX interface 2814. The control data is transferred between the control unit 2804 and the control unit 2802.

The multimedia multiplexing/demultiplexing and interterminal signal control unit 2804 further demultiplexes the data demultiplexed from within the received communication frame, into G3-FAX data, computer data, various control data, etc. in accordance with protocols stipulated with the opposite transmission terminal equipment beforehand, and it delivers these data to the G3-FAX modular jack 2820 and RS232C connector 2821 through the FAX interface 2814 and data interface 2815, respectively.

Conversely, the control unit 2804 accepts data to be transmitted in a multiplexed state, from the G3-FAX modular jack 2820 and RS232C connector 2821.

The camera 2807 picks up an image, and the monitor 2101 presents the display output of a picture corresponding to the image. The video switch 2806 supplies the picture codec 2805 with an input from the video signal input terminal 2816, instead of an input from the camera 2807. Thus, the document photographing stand 2004 as well as an external camera and the picture codec 2805 can be connected to the video input interface 2816.

The picture codec 2805 codes an input picture signal, and delivers the resulting coded signal to the multimedia multiplexing/demultiplexing and interterminal signal control unit 2804. In addition, it decodes video data demultiplexed from within a received communication frame by the control unit 2804 and then delivers the resulting decoded data to the monitor 2101 and the video output interface 2817. Accordingly, the video tape recorder 2006 can be connected to the video output interface 2817 so as to record the contents of the teleconference. Also, an external monitor can be connected.

The audio input and output terminals 2818 and 2819 can have the audio input and outputs of external audio devices connected thereto. The audio switch 2813 is one by which any of an input from the G3 FAX connected to the FAX interface 2814, an input from a device connected to the audio input interface 2819, and an input from the microphones 2003 coupled with the control keyboard 2002 connected to the connector 2822 is transferred to the audio codec 2810 through the echo canceler 2811.

The audio codec 2810 codes an input speech signal, and delivers the resulting coded signal to the multimedia multiplexing/demultiplexing and interterminal signal control unit 2804. In addition, it decodes audio data demultiplexed from within a received communication frame by the control unit 2804 and then delivers the resulting decoded data to the loudspeaker 2104 and the audio output interface 2818 through the echo canceler 2811 as well as the audio amplifier 2812. The audio output interface 2818 has, for example, the audio input terminal of the video tape recorder 2006 connected thereto. The echo canceler 2811 performs an echo canceling process between the speech signal decoded from the audio data and the speech signal delivered from the audio switch 2813, thereby preventing the occurrence of howling during communications. Incidentally, the howling may well be prevented by replacing the echo canceler 2811 with an echo suppressor which suppresses a selected one of the output from the audio amplifier 2812 or the input to the audio switch 2813.

The FAX interface 2814 delivers a signal to-be-transmitted supplied from the G3 FAX being an analog FAX connected to the G3-FAX modular jack 2820, to the audio codec 2810 in the case of treating the FAX data as audio data, while it digitizes the signal to-be-transmitted into a code and delivers the code to the multimedia multiplexing/demultiplexing and interterminal signal control unit 2804 in the case of treating the FAX data as data to-be-multiplexed. Contrariwise, when supplied with received data for the G3 FAX by the audio codec 2810, the FAX interface 2814 supplies the G3-FAX modular jack 2820 with the received data directly, and when supplied with received G3 FAX data by the multimedia multiplexing/demultiplexing and interterminal signal control unit 2804, the FAX interface 2814 decodes the received data into an analog signal and delivers the analog signal to the G3-FAX modular jack 2820.

The RS232C connector 2821 serves as an RS232C interface, and it is a connector to which a computer, a word processor or an electronic blackboard can be connected. This RS232C connector 2821 is connected to the control unit 2802 or the multimedia multiplexing/demultiplexing and interterminal signal control unit 2804 through the data interface 2815.

The control unit 2802 performs serial data communications with the control keyboard 2002. Besides, it performs various controls for the constituents of the teleconference terminal equipment 2001, for example, the display control of a menu picture to be described later, on the basis of data transferred from the multimedia multiplexing/demultiplexing and interterminal signal control unit 2804 and data transferred from the control keyboard 2002.

Meanwhile, the picture codec 2805 codes and decodes pictures in conformity with algorithms stipulated in CCITT Standard, H. 261. Herein, it can be reduced in size by applying recent highly-packaged circuit technology. A picture codec is implemented with two circuit boards each having a size nearly equal to the A5-format in, for example, a commercially-available video telephone set HV-100 (trade name) manufactured by Hitachi, Ltd. In the future, such picture codecs will be increasingly reduced in size.

Accordingly, the teleconference terminal equipment of this embodiment can be satisfactorily realized with the dimensions mentioned before in relation to FIG. 15 and FIGS. 16A and 16B, for the 11-inch cathode-ray tube. Moreover, these dimensions afford a size which is suited to installation of the terminal equipment on a desk or to carrying.

Next, the control keyboard 2002 will be explained.

Figure 22:
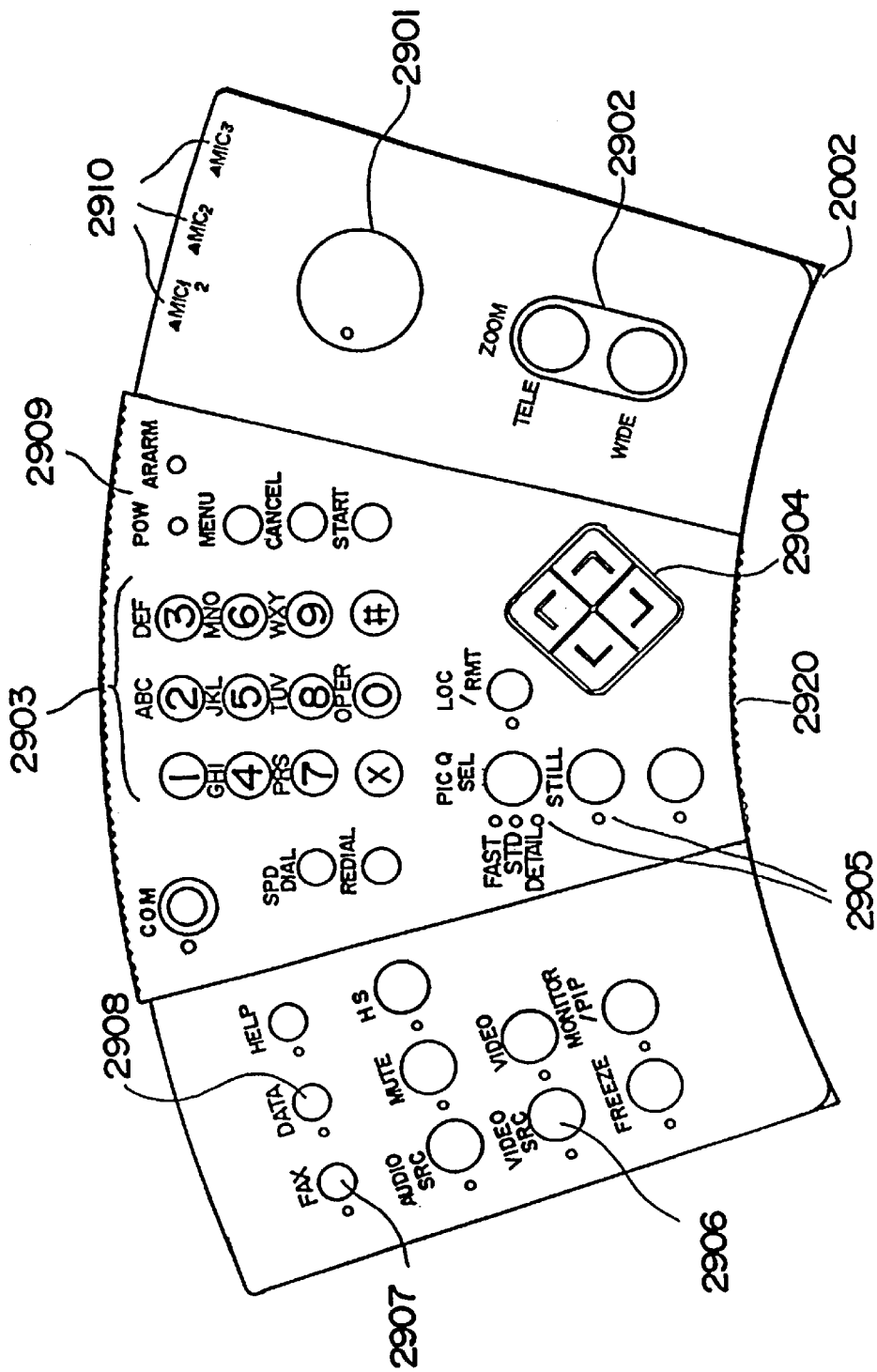
FIG. 22 is an explanatory view showing the external construction of a control keyboard according to the second embodiment of the present invention.

FIG. 22 shows the external appearance of the control keyboard 2002. As shown in the figure, the control keyboard 2002 is in the shape of a sector. Various keys are arranged on the upper surface of this control keyboard, while terminals 2910 for connecting microphones and also terminals for cables for connections with the teleconference terminal equipment 2001 are disposed on the rear surface. Besides, a built-in microphone 2920 is arranged in the front of this control keyboard.

The keys disposed on the upper surface of the control keyboard 2002, and functions which are designated by these keys will be listed in Tables 1 and 2 below:

TABLE 1

| Names | Outlines of Functions |
|---|---|
| START | Transmit func: dialing. |
|  | Preset func: Input acknowledging dial. |
| REDIAL | Retransmitting to last called address. |
| SPD DIAL | Speedy dialing to registered No. by designating the No. |
| MUTE | Turning off transmission speech, and transmitting mute. |
| CANCEL | Deleting last input letter. (Also, ending help.) |
| COM | Alternating HOOK states. |
| MENU | Registering, settling on acknowledging TEL directory, operation modes. etc. |
| VIDEO | Non-com. period: Changing-over Auto/Manual picture sending. |
|  | Com. period: Requesting for manual picture sending. |
| MON/PIP | Monitor-displaying transmission picture (coded picture) on Whole screen/Minor screen. |
| FREEZE | Freezing input of transmission picture. |
| AUDIO SRC | Changing-over transmission speech between handset input and external speech input. |
| VIDEO SRC | Changing-over transmission picture between accessory camera input and external video input. |
| HELP | Displaying help information on function keys, etc. |

TABLE 1-continued

| Names | Outlines of Functions |
| --- | --- |
| FAX | Connecting FAX and TEL circuit for transmission/reception. |
| DATA | Turning ON/OFF RS232C port for data com. between both terminal equipments. |
| TELE ↑ | Zooming out built-in camera. (Hard) |
| WIDE ↓ | Zooming in built-in camera. (Hard) |
| VOL ↑ | Increasing sound volume of loudspeaker. (Hard) |
| VOL ↓ | Decreasing sound volume of loudspeaker. (Hard) |

TABLE 2

| Names | Outlines of Functions |
| --- | --- |
| CURSOR ↑ | Spare, tilt ↑. |
| CURSOR ↓ | Spare, tilt ↓. |
| CURSOR → | Spare, pan →. |
| CURSOR ← | Spare, pan ←. |
| PIC Q SEL | Changing-over quality of transmission picture in 3 stages (STD/FAST/DETAIL). |
| HS | Changing-over loudspeaker and handset. |
| LOC/RMT | Changing-over LOCAL/REMOTE for panning, tilting, zooming or focusing control. |

Typical keys will be explained. In FIG. 22, numeral 2901 indicates a volume control for controlling the sound volume of the loudspeaker 2104 built in the teleconference terminal equipment 2001. Numeral 2902 indicates keys for controlling the zooming functions of the camera 2807. Denoted by numeral 2903 are numerical-keys and function keys which serve to control the communication functions of the teleconference terminal equipment 2001, and which are equivalent to those of an ISDN terminal equipment. In this embodiment, however, the numerical-keys are shared with alphabet keys. Keys 2904 serve to control a pan-tilter which is sometimes installed for the camera 2807 of the teleconference terminal equipment 2001. Besides, keys 2905 serve to change-over the picture qualities of pictures to-be-transmitted, a key 2906 serves to change-over the input of the built-in camera 2807 of the teleconference terminal equipment 2001 and the input of the external camera set on, for example, the document photographing stand 2004 as a transmission picture, and keys 2907 and 2908 serve to change-over transmission data from video or audio data to input data from the facsimile machine and small-sized computer connected to the teleconference terminal equipment 2001, respectively. Further, indicators, such as an LED 2909 for indicating the connection of the power supply, are provided on the upper surface of the control keyboard 2002.

Figure 23A:
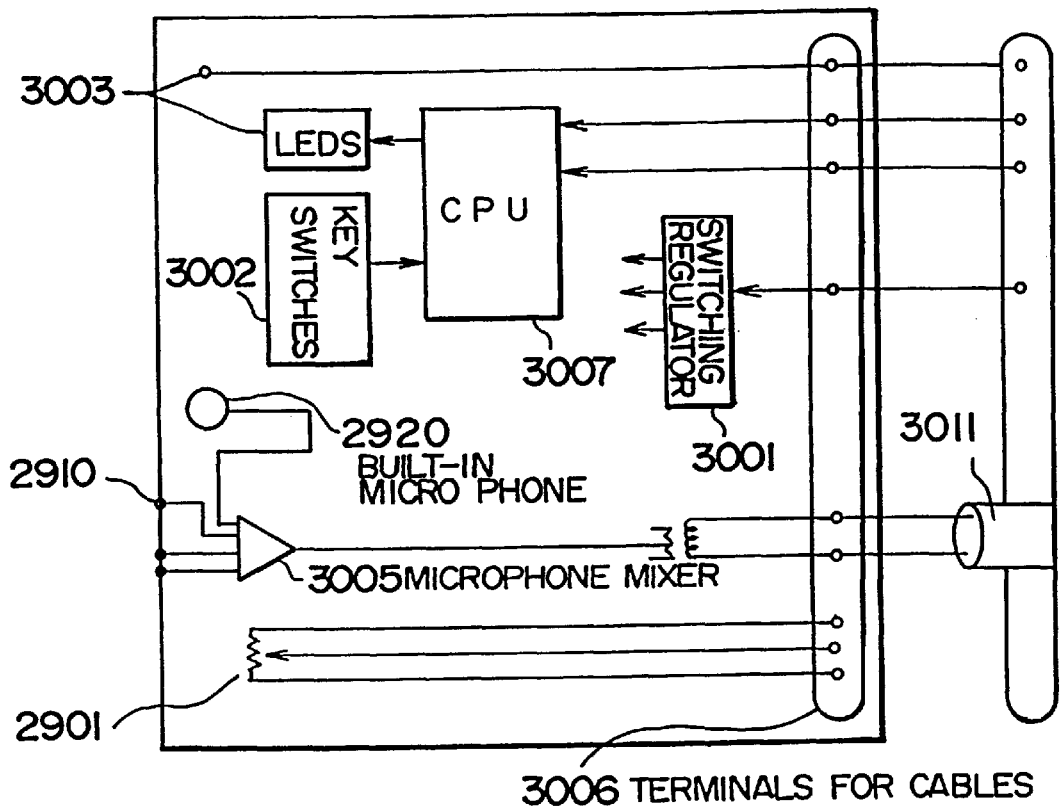
FIGS. 23A and 23B are a block diagram and a schematic diagram, respectively, showing the internal construction of the control keyboard of the second embodiment.
Figure 23B:
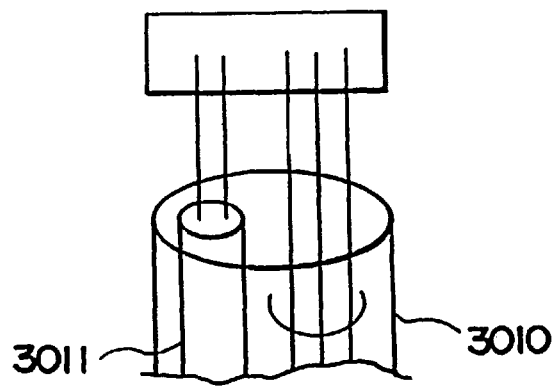

FIGS. 23A and 23B show the internal construction of the control keyboard 2002.

As shown in FIG. 23A, the control keyboard 2002 includes a switching regulator 3001 by which a supply voltage fed from the teleconference terminal equipment 2001 is distributed to the individual parts of this control keyboard, key switches 3002 which constitute the various keys stated before, and LED's 3003. In addition, it includes a CPU 3007 which controls the key switches 3002 and the LED's 3003 while performing the serial data communications with the teleconference terminal equipment 2001 by the use of data clock pulses supplied from this teleconference terminal equipment. Also included are the built-in microphone 2920, the microphone jacks 2910 for connecting the external microphones 2003, a microphone mixer 3005 for mixing an input from the built-in microphone 2920 and inputs from the external microphones 2003, and the volume control 2910 for adjusting the sound volume of the loudspeaker of the teleconference terminal equipment 2001. Shown at numeral 3006 are terminals for cables 3010 which lead to the teleconference terminal equipment 2001.

As seen from the figures, the connections between this control keyboard 2002 and the teleconference terminal equipment 2001 are collectively effected by the single composite cable 3010. Besides, an output from the microphone mixer 3005 is sent to the teleconference terminal equipment 2001 through a transformer of 600 ohms by the use of a shielded cable 3011 which is disposed within the composite cable 3010 as shown in FIG. 23B.

Next, the document photographing stand 2004 will be explained.

Figure 24:
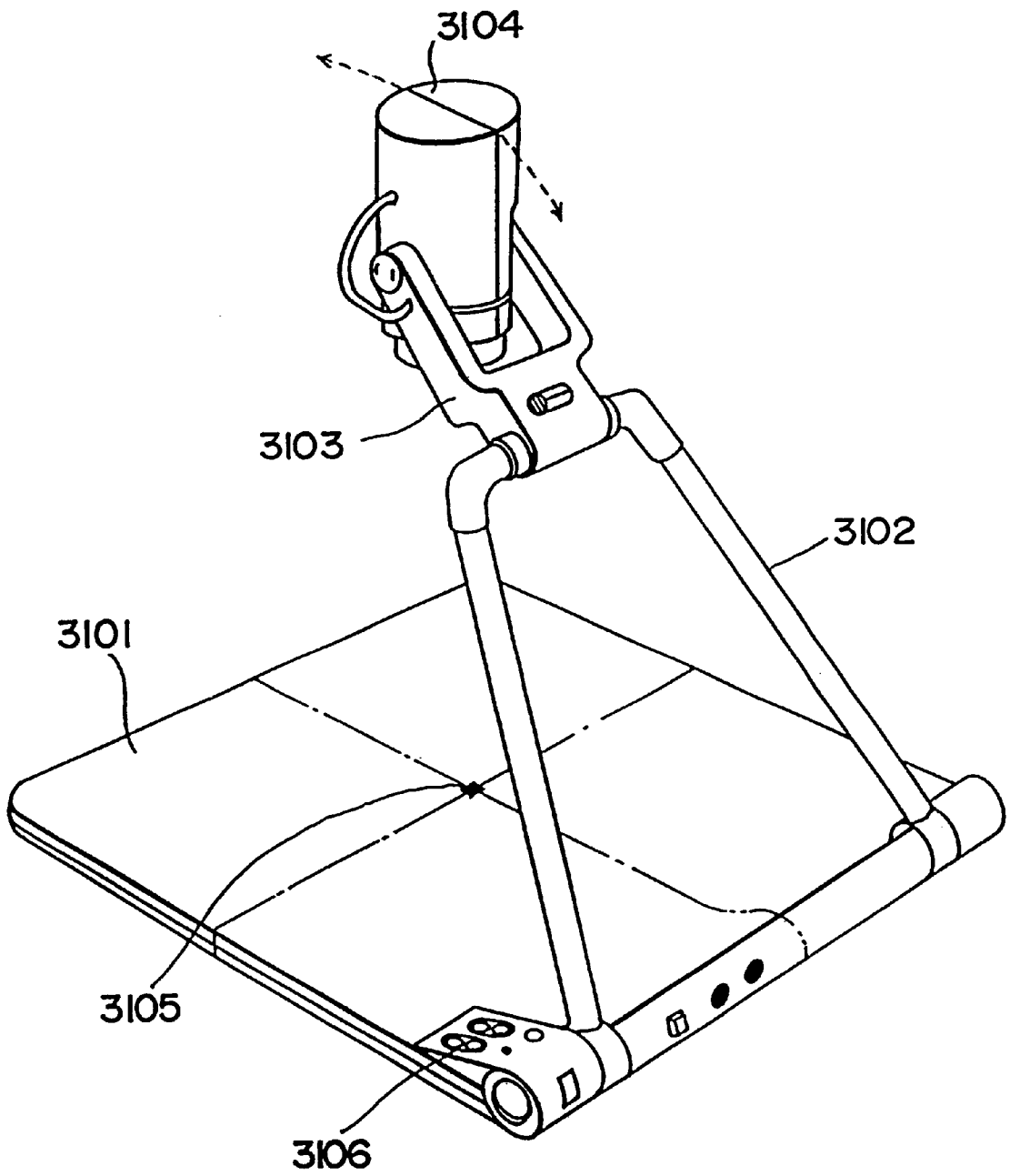
FIG. 24 is an exterior view showing the construction of the first document photographing stand according to the second embodiment of the present invention.

FIG. 24 shows the external appearance of the document photographing stand 2004.

Roughly speaking, the document photographing stand 2004 is constructed of a work surface 3101, a lower link 3102, an upper link 3103 and the camera 3104. Besides, an LED 3105 is embedded in the central part of the platen 3101 to-be-photographed, and camera controlling keys 3106 are disposed at one corner of the work surface 3101. The camera controlling keys 3106 include zooming control keys (wide angle/telescopic), an autofocusing function enabling key and a manual focusing controlling key for the camera 3104.

The lower link 3102 is pivotally mounted on the work surface 3101, the upper link 3103 is pivotally mounted on the lower link 3102, and the camera 3104 is pivotally mounted on the upper link 3103. Thus, the camera 3104 can photograph, not only a document set on the work surface 3101, but also spaces before and behind the work surface 3101. Accordingly, when the blackboard 2005 is arranged behind the work surface 3101 as shown in FIG. 14 referred to before, characters, patterns etc. written and drawn on this blackboard can be photographed and transmitted except during the photographing of the document.

The LED 3105 embedded in the central part of the work surface 3101 serves to facilitate the positioning of the document to-be-photographed. More specifically, when an illuminator is provided in this manner, the central point of photographing can be readily established using the transmitted light even for paper or the like which is placed on the work surface 3101 for photographing. Herein, LED's may well be disposed at the four corners of a photographing region on the work surface 3101 for a document of standard size (for example, A4-format or B5-format). Owing to the transmitted light beams of such LED's, the desired region of a document larger than the standard size can be established and photographed more easily than with a conventional work surface on which the four corners are marked.

In the drawings, FIGS. 25A and 25B are a side view and a rear view, respectively, of the document photographing stand 2004.

As shown in FIG. 25A, the length l of the lower link 3102 is set so as not to exceed the length L of the work surface 3101, and the length m of the upper link 3103 is set so as to be shorter than the length l of the lower link 3102. Besides, as shown in FIG. 25B, the width N between both the arms of the lower link 3102 is set greater than the width n between both the arms of the upper link 3103. Accordingly, as seen from a front view, a side view and a plan view depicted in FIGS. 38A, 38B and 38C, respectively, the lower link 3102 can be folded onto the work surface 3101, and the upper link 3103 can be folded inside the lower link 3102. Thus, the document photographing stand 2004 can be carried or stored in a compact state.

Figure 26A:
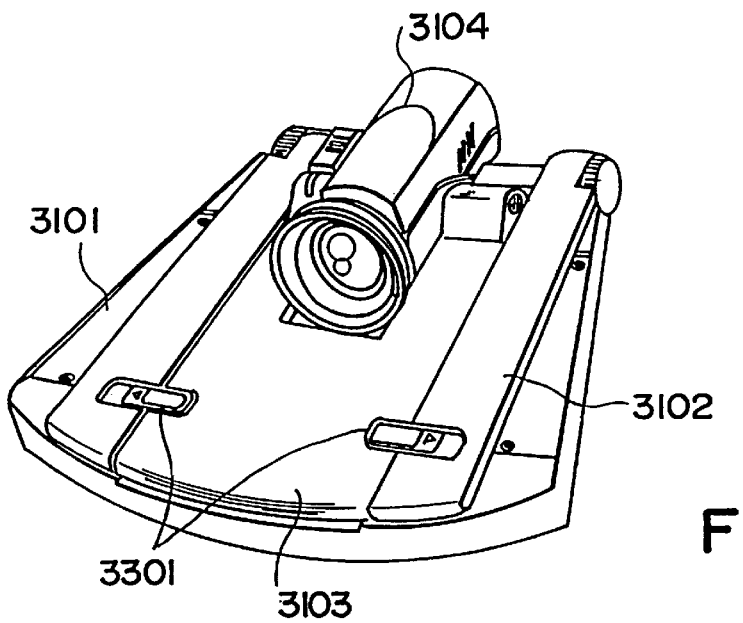
FIGS. 26A, 26B and 26C are exterior views showing the construction of the second document photographing stand according to the second embodiment of the present invention.
Figure 26B:
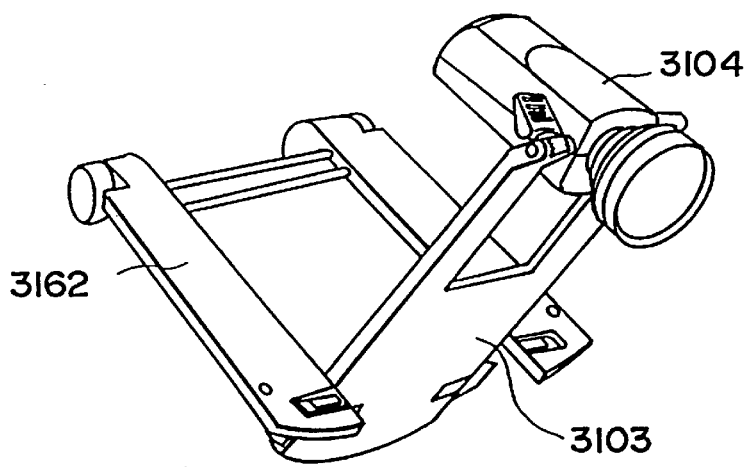
Figure 26C:
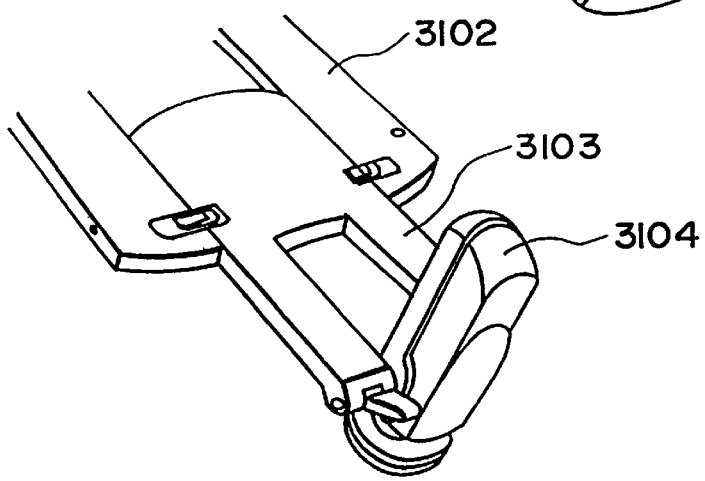

Alternatively, the document photographing stand 2004 may well be constructed as illustrated in FIGS. 26A, 26B and 26C.

FIG. 26A shows the state in which the stand 2004 is carried or stored. FIGS. 26B and 26C show the situation in which an upper link 3103 is turned relative to a lower link 3102. Numeral 3301 indicates stoppers to restrict the turning.

Figure 27:
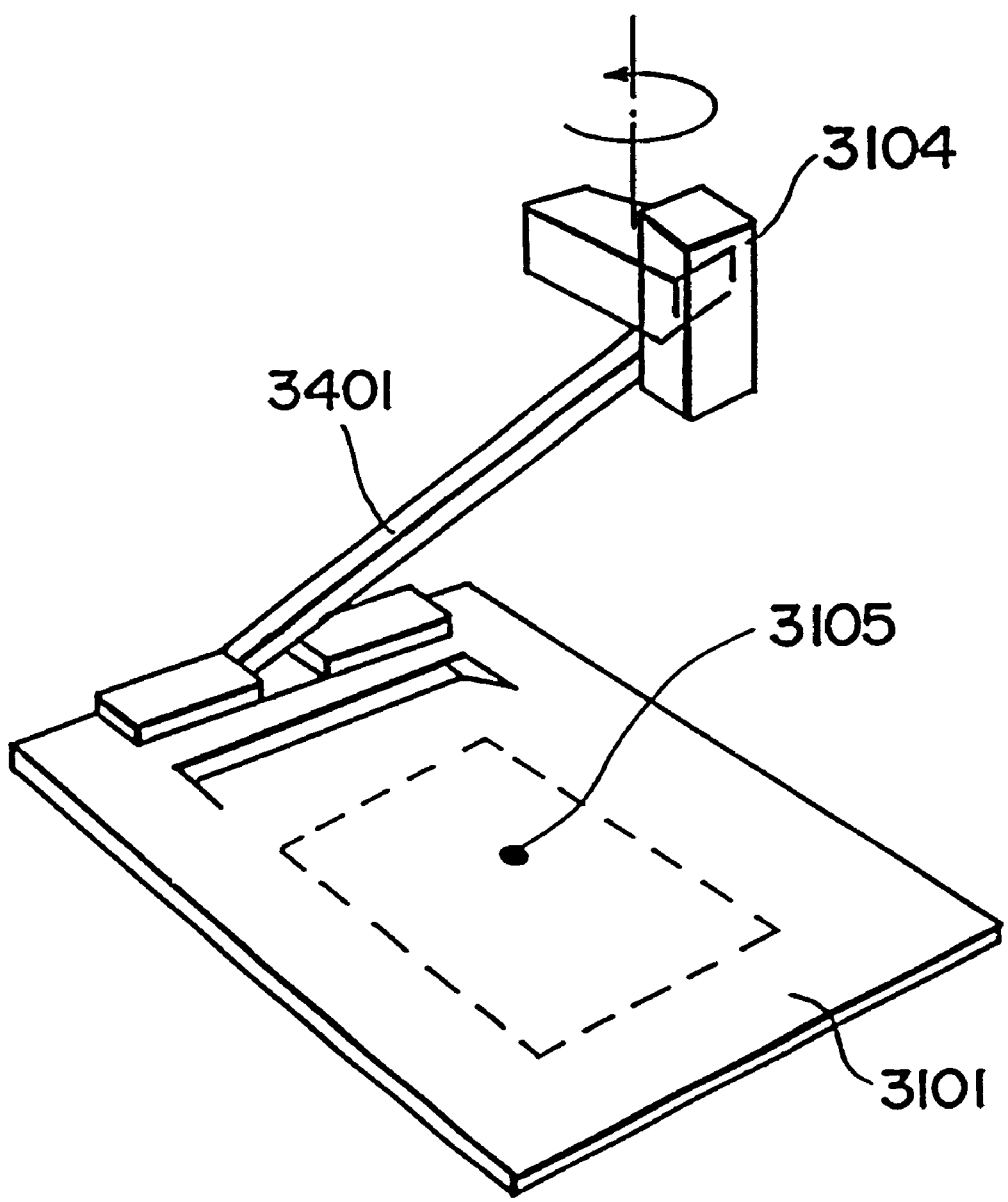
FIG. 27 is an exterior view showing the construction of the third document photographing stand according to the second embodiment of the present invention.

Further, the document photographing stand 2004 may well be constructed in a simpler form as illustrated in FIG. 27.

The example shown in FIG. 27 is configured of a work surface 3101, a camera 3104 and a single link 3401. The link 3401 can be lengthened and shortened by a slide mechanism, and the camera 3104 is connected to the link 3401 so as to be freely turnable relative to this link.

Figure 28:
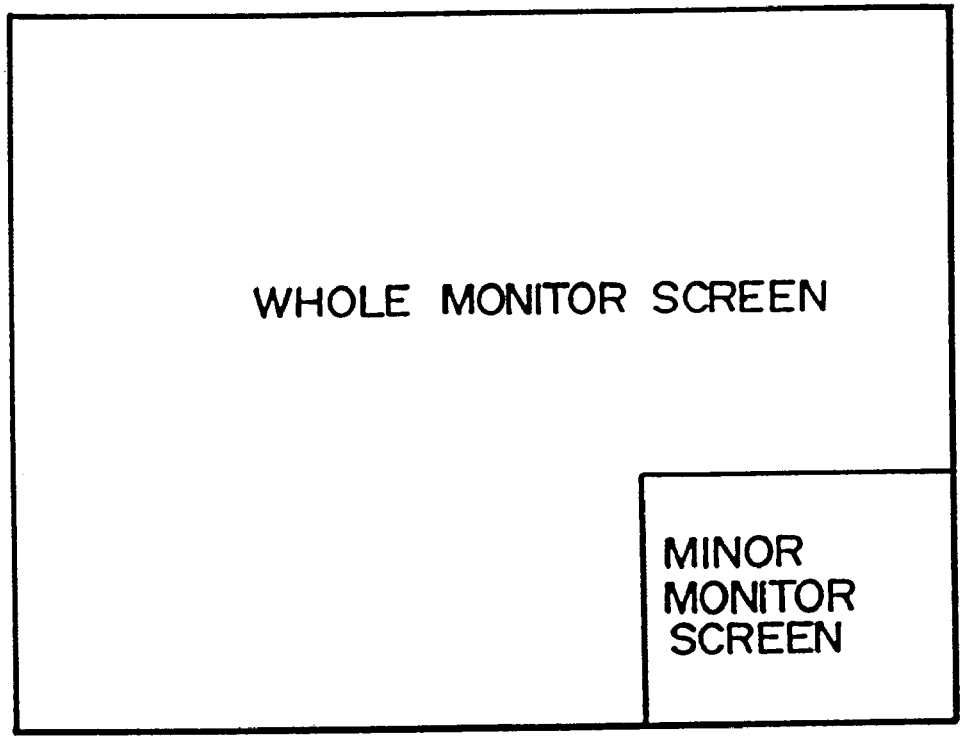
FIG. 28 is an explanatory view showing the situation of a minor frame display in the teleconference terminal equipment of the second embodiment.
Figure 29A:
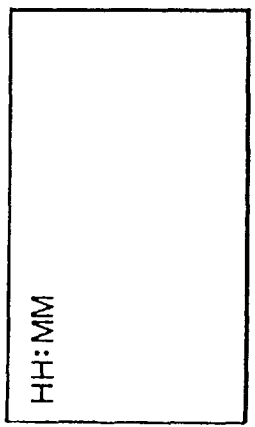
FIG. 29 is an explanatory diagram showing messages which are displayed on a monitor screen in the teleconference terminal equipment of the second embodiment.
Figure 29B:
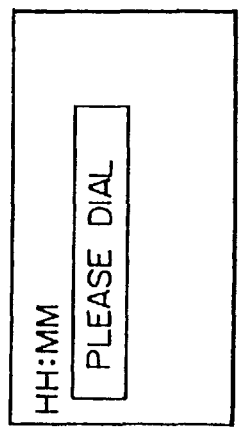
Figure 29C:
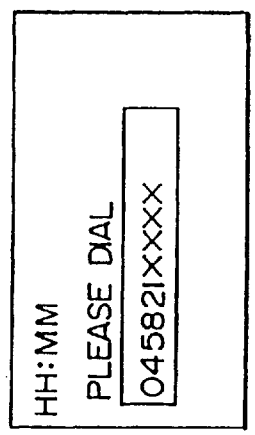
Figure 29D:
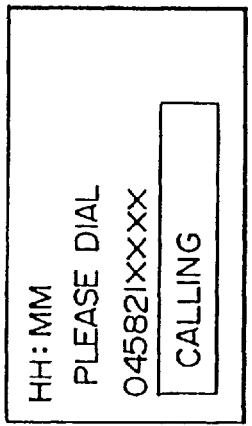
Figure 29E:
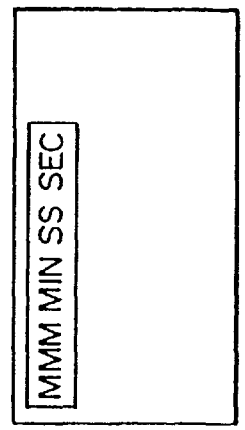
Figure 29F:
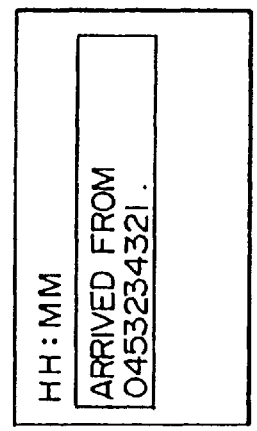
Figure 30B:
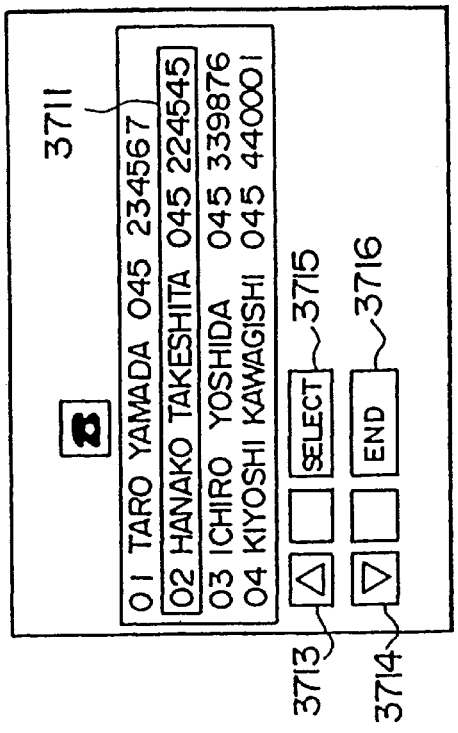
FIG. 30 is an explanatory diagram showing graphic user interfaces which are offered by the teleconference terminal equipment of the second embodiment.
Figure 30D:
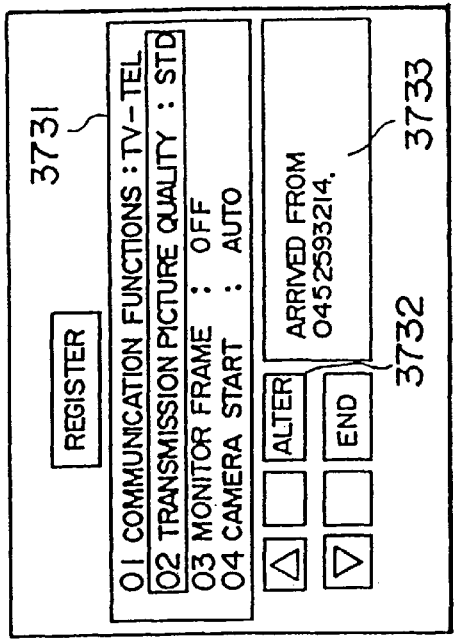
Figure 30A:
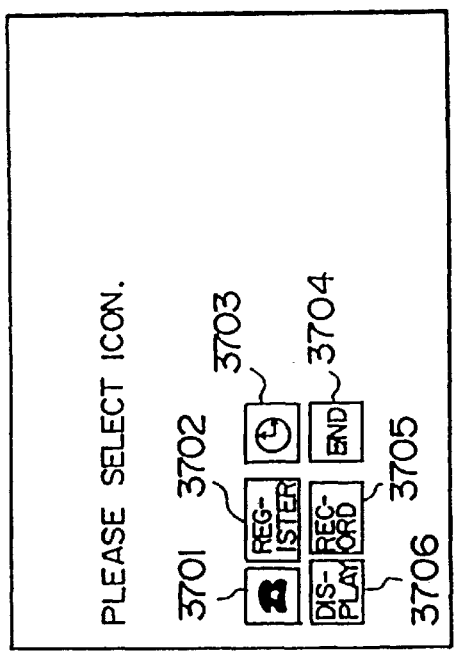
Figure 30C:
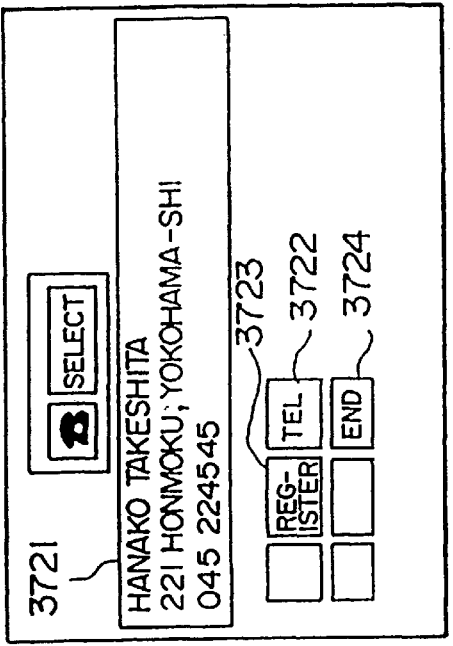
Figure 31A:
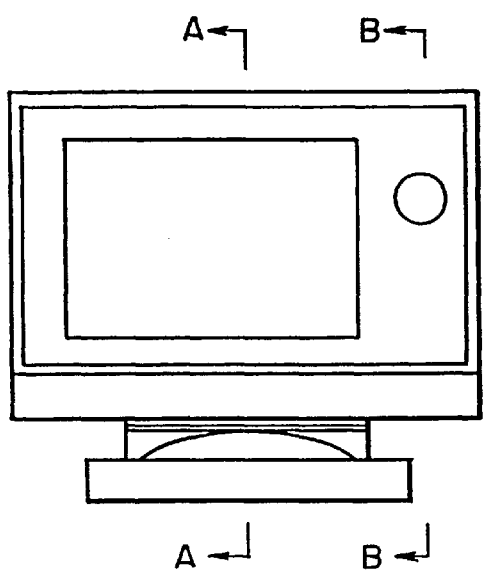
FIGS. 31A, 31B, 31C and 31D are a front view, a rear view, a plan view and a bottom view, respectively, of the first teleconference terminal equipment of the second embodiment.
Figure 31B:
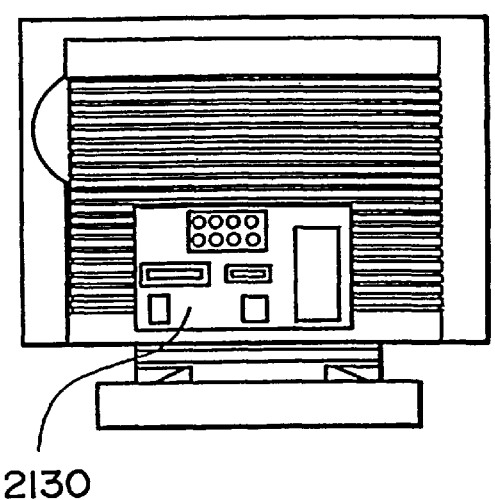
Figure 31C:
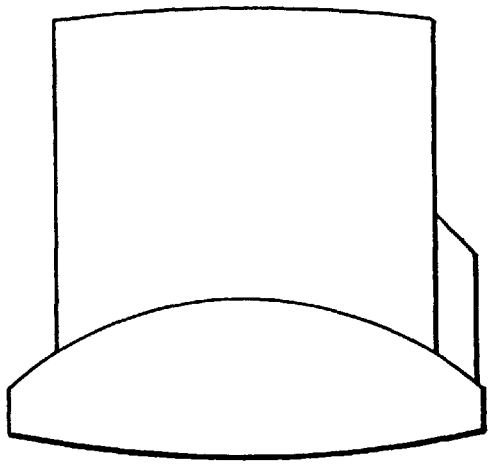
Figure 31D:
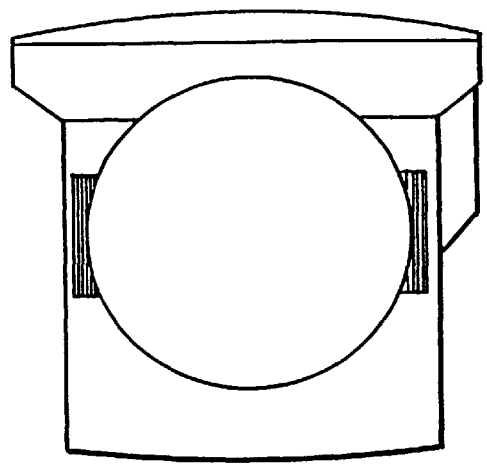

Finally, the man-machine interface of the teleconference system will be explained. During a teleconference, the received picture of the opposite communicating side is usually displayed on the screen of the monitor 2101. When the monitor/PIP key of the control keyboard 2002 stated before is depressed, the teleconference terminal equipment 2001 presents a minor frame at the right corner of the monitor 2101 and displays the self-picture thereof photographed by its own camera 2807, as illustrated in FIG. 28. Further, when the monitor/PIP key is depressed in this state, the teleconference terminal equipment 2001 displays the self-picture on the whole monitor screen, and when the key is depressed again, the teleconference terminal equipment 2001 brings the screen back into the usual state and displays the picture of the opposite communicating side on the whole monitor screen. Such a picture-in-picture display process has been described in connection with the first embodiment, and shall not be detailed here.

In addition, the teleconference terminal equipment 2001 guides operations and reports current statuses by the use of the display of the monitor 2101.

FIG. 29 illustrates the situations of the operation guidance and status report utilizing the monitor 2101.

Letter a in FIG. 29 denotes the display of the monitor 2101 upon connection of the power supply. The current time is indicated at the left upper corner part of the display screen of the monitor 2101.

When the start key of the control keyboard 2002 is depressed in this state, the monitor display is changed as shown at b in FIG. 29, and a message promoting for a dial input is indicated. Subsequently, when the numerals of the telephone No. of the opposite communicating side for the teleconference are input with the numerical-keys of the control keyboard 2002, they are successively indicated as shown at c in FIG. 29. Next, when the start key is depressed again by the operator of the control keyboard 2002 upon acknowledging the indicated telephone No., the teleconference terminal equipment 2001 establishes a channel with the ISDN to transmit the input No., and it presents a display to indicate that it is calling the opposite terminal as shown at d in FIG. 29. Then, when communications with the opposite terminal have begun, only the elapsed time since the beginning of communication is indicated as shown at e in FIG. 29.

On the other hand, in a case where a signal or ringing arrives at the teleconference terminal equipment 2001 during a non-communicating period, a display to the effect that the signal has arrived is presented together with the telephone No. of the transmitting source as shown at f in FIG. 29.

Moreover, the teleconference terminal equipment 2001 according to this embodiment offers other various functions in a menu form.

FIG. 30 illustrates menus which are displayed on the monitor 2101.

When the menu key among the control keys is depressed when the power supply is connected or during the communications, that is, in the display state shown at a or e in FIG. 29, the main menu shown at a in FIG. 30 is displayed.

In the menu a in FIG. 30, patterns are icons which are provided in correspondence with the offered functions. The icon 3701 serves to start a telephone directory function, the icon 3702 serves to start the function of setting any of the various statuses of the teleconference terminal equipment 2001 such as the communication mode and display mode thereof, the icon 3703 serves to start the function of adjusting the time of a timepiece built into the teleconference terminal equipment 2001, the icon 3705 serves to start the function of handling information items (opposite communicating sides, telephone Nos, fees, etc.) on past communications, and the icon 3706 serves to select whether or not the time displays shown in FIG. 29 are presented. Besides, the icon 3704 serves to end the menu. The respective icons are displayed in an arrangement corresponding to the arrangement of the numerals 1–6 of the numerical-keys of the control keyboard 2002, and the depression of the key at the corresponding position starts the function which is offered by the pertinent icon.

By way of example, when the telephone directory function is started by depressing the numerical-key "1", a menu as shown at b in FIG. 30 is displayed. More specifically, the same pattern as the icon having started this function is indicated at the uppermost part, and the names and telephone Nos. of the opposite communicating persons already registered are indicated in an area 3711. The user scrolls the indication within the area 3711 by designating an icon 3713 or 3714 through the depression of the numerical-key at the corresponding position and then appoints the opposite communicating person whose information is to be handled, by designating a select icon 3715 through the depression of the numerical-key at the corresponding position. An icon 3716 is used for returning to the menu picture a in FIG. 30.

Here, when the select icon 3715 is designated, a menu shown at c in FIG. 30 is displayed. The patterns of the icon which has started the corresponding function and the icon which was indicated at the uppermost part of the parent menu of this menu are indicated at the uppermost part, and all information items registered for the selected communicating person are indicated in an area 3721. A TEL icon 3722 serves to designate a transmission to the opposite communicating person indicated in the area 3721. When the numerical-key corresponding to this icon is depressed, the teleconference terminal equipment 2001 calls the selected communicating person in accordance with the registered information and ends the menu processing steps, to shift to the display shown at d in FIG. 29. An icon 3724 in the menu c in FIG. 30 serves to alter the registered information by way of example. More specifically, when the numerical-key corresponding to this icon is depressed, the function of, for example, altering the registered information is indicated, and a new menu corresponding to the function is displayed. In the new menu, necessary input functions are similarly assigned to the keys of the control keyboard 2002 so as to accept the user's inputs of information. Herein, by way of example, alternatives to an input character are sequentially changed-over in accordance with a predetermined input key. Moreover, the conversion of inputs into Chinese characters can be realized by extending the function of a predetermined input key.

Meanwhile, in a case where the register icon 3702 has been designated in the main menu a in FIG. 30, a menu shown at d in FIG. 30 is displayed. In this menu d in FIG. 30, the current statuses of the teleconference terminal equipment 2001 are indicated in an area 3731. The user designates any indicated item and also designates an alter icon 3732 in accordance with steps similar to those of the operation of the menu b in FIG. 30, whereby the status of the designated item can be changed to another alternative registered beforehand.

In this regard, in a case where the teleconference terminal equipment 2001 has been called amidst such a hierarchic menu process, a display to the effect that a signal or ringing has arrived is presented in an area 3733.

For reference, FIG. 31A thru FIG. 38C in the accompanying drawings illustrate the six views, etc. concerning the teleconference terminal equipment 2001 depicted in FIG. 15, the control keyboard 2002 depicted in FIG. 22 and the document photographing stand 2004 depicted in FIG. 24.

Figure 32A:
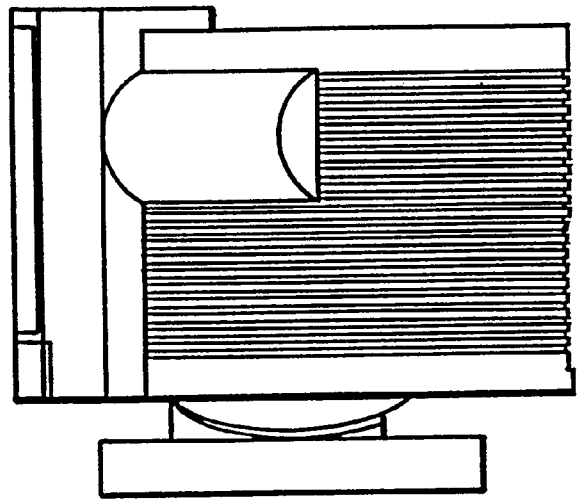
FIGS. 32A and 32B are a right side view and a left side view, respectively, of the first teleconference terminal equipment of the second embodiment.
Figure 32B:
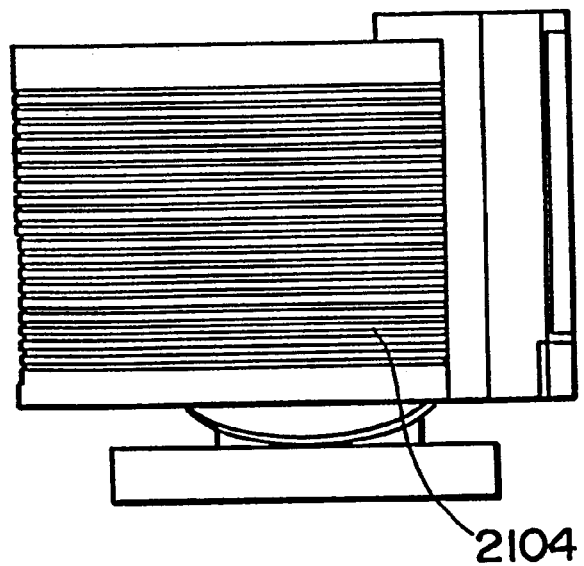

FIGS. 31A, 31B, 31C and 31D are a front view, a rear view, a plan view and a bottom view, respectively, of the teleconference terminal equipment 2001. The terminals 2816–2822 and 2830 are disposed in the area 2130 shown in FIG. 31B. FIGS. 32A and 32B are a right side view and a left side view, respectively, of the teleconference terminal equipment 2001. Numeral 2104 in FIG. 32B indicates the position of the built-in loudspeaker.

Figure 33:
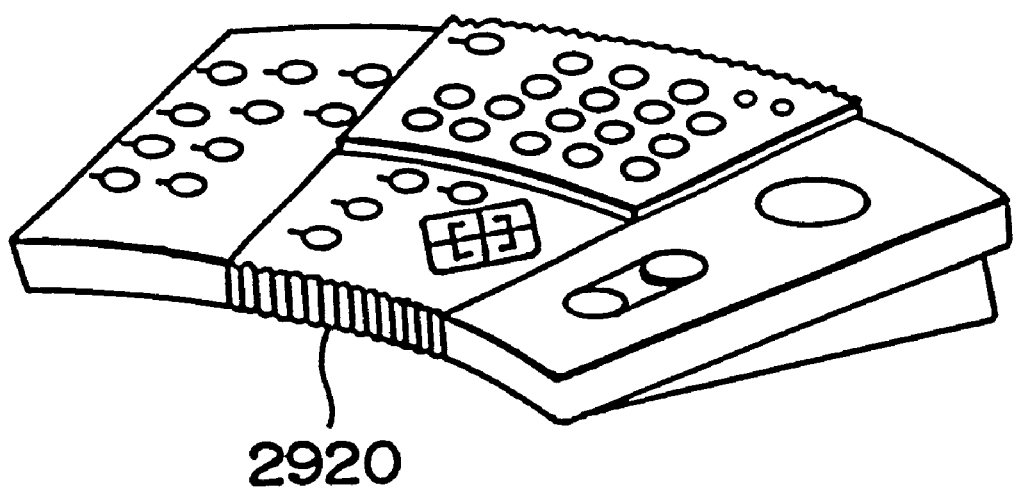
FIG. 33 is a perspective view of the control keyboard of the second embodiment.
Figure 34A:
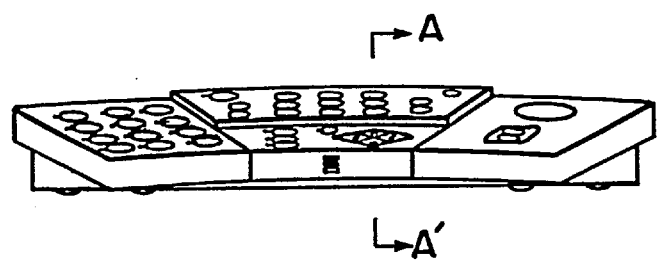
FIGS. 34A, 34B and 34C are a front view, a plan view and a bottom view, respectively, of the control keyboard of the second embodiment.
Figure 34B:
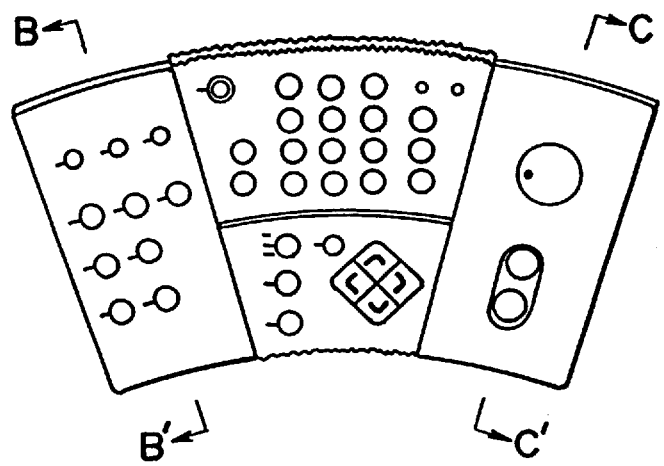
Figure 34C:
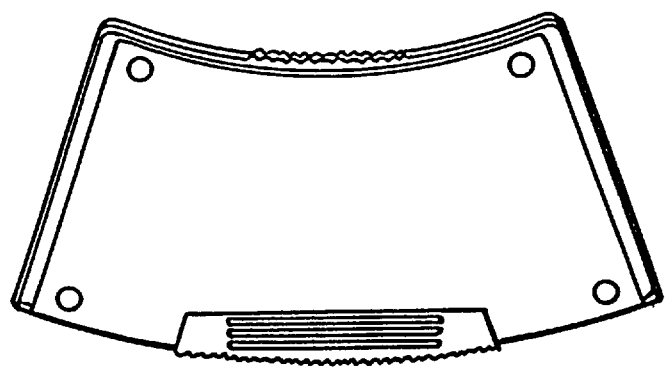
Figure 35A:
FIGS. 35A, 35B, 35C, 35D, 35E and 35F are, respectively, a right side view, a left side view, a rear view, a schematic sectional view taken along line A–A' in FIG. 34A, a schematic sectional view taken along line B–B' in FIG. 34B and a schematic sectional view taken along line C–C' in FIG. 34B.
Figure 35B:
Figure 35C:
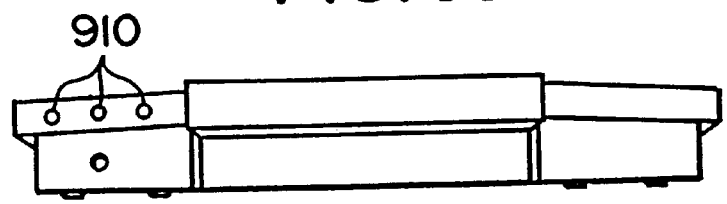
Figure 35D:
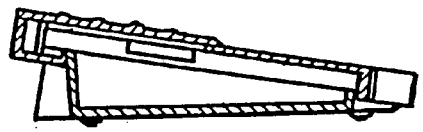
Figure 35E:
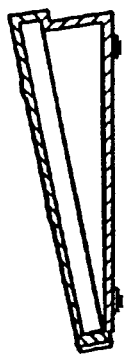
Figure 35F:
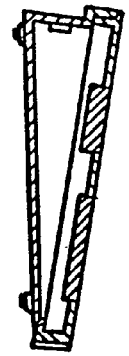
Figure 36A:
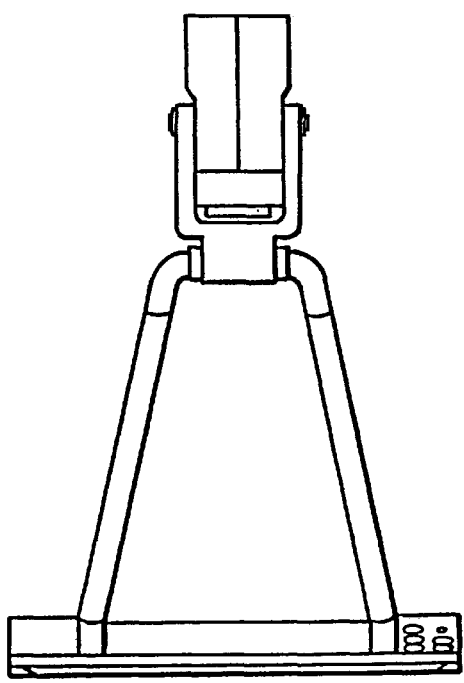
FIGS. 36A, 36B, 36C and 36D are a front view, a right side view, a plan view and a bottom view, respectively, of the document photographing stand of the second embodiment.
Figure 36B:
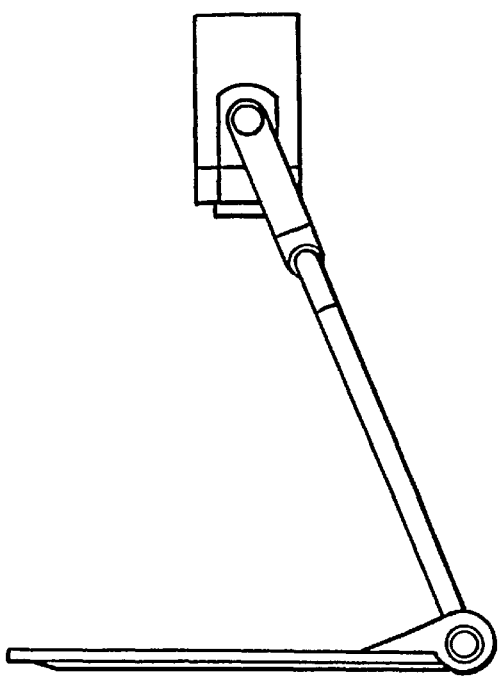
Figure 36C:
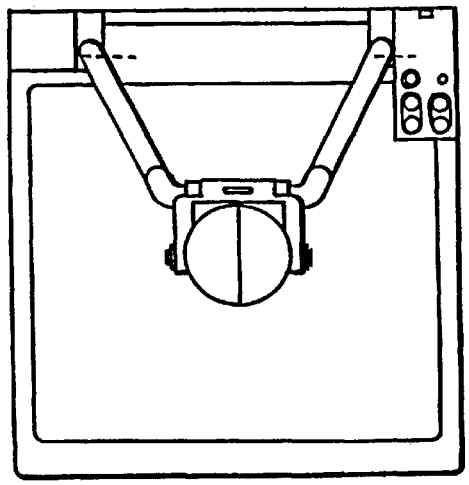
Figure 36D:
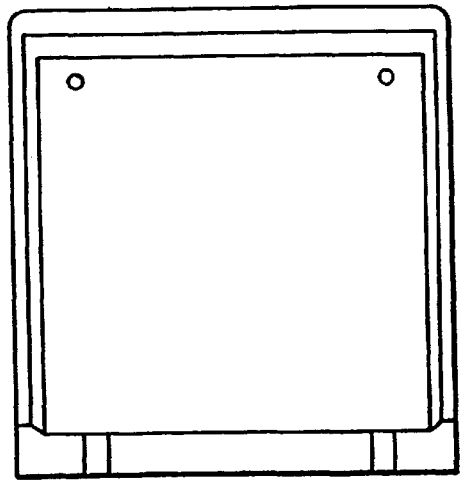

FIG. 33 is a perspective view of the control keyboard 2002. Numeral 2920 in this figure indicates the position of the built-in microphone. In addition, FIGS. 34A, 34B and 34C are a front view, a plan view and a bottom view, respectively, of the control keyboard 2002. Besides, FIGS. 35A, 35B, 35C, 35D, 35E and 35F are a right side view of the control keyboard 2002, a left side view thereof, a rear view thereof, a schematic sectional view thereof taken along line A–A' in FIG. 34A, a schematic sectional view thereof taken along line B–B' in FIG. 34B, and a schematic sectional view thereof taken along line C–C' in FIG. 34B, respectively. In FIG. 35C, numeral 2910 represents the terminals for connecting the external microphones.

Figure 37A:
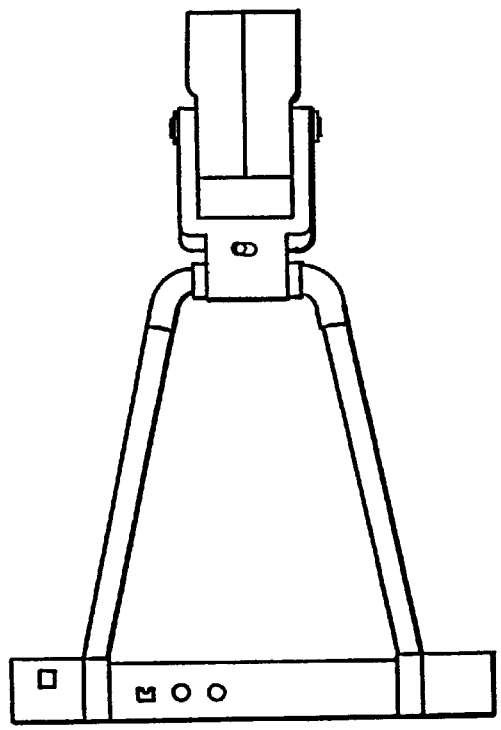
FIGS. 37A and 37B are a rear view and a left side view, respectively, of the document photographing stand of the second embodiment.
Figure 37B:
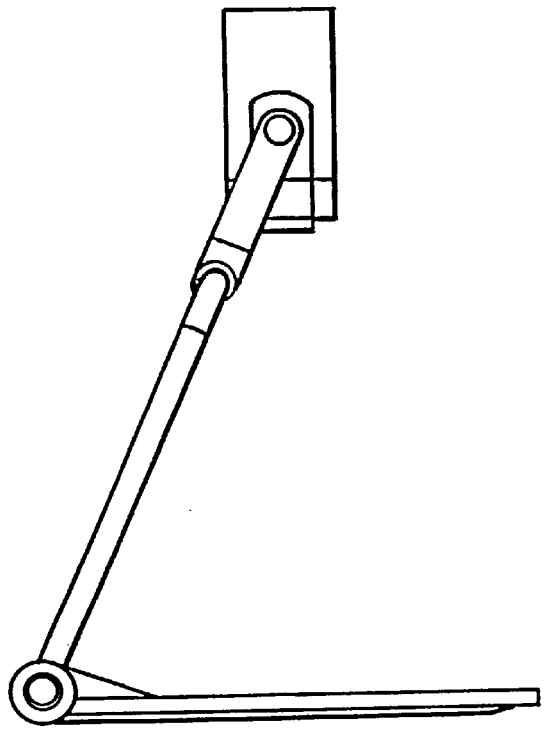

Next, FIGS. 36A, 36B, 36C and 36D are a front view, a right side view, a plan view and a bottom view, respectively, of the document photographing stand 2004. In addition, FIGS. 37A and 37B are a rear view and a left side view, respectively, of the stand 2004.

Figure 38A:
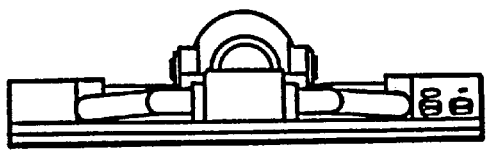
FIGS. 38A, 38B and 38C are a front view, a right side view and a plan view, showing the folded state of the document photographing stand of the second embodiment.
Figure 38B:
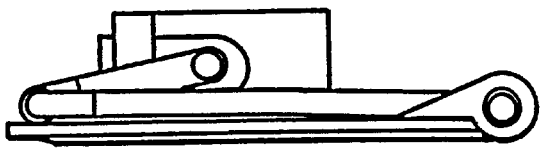
Figure 38C:
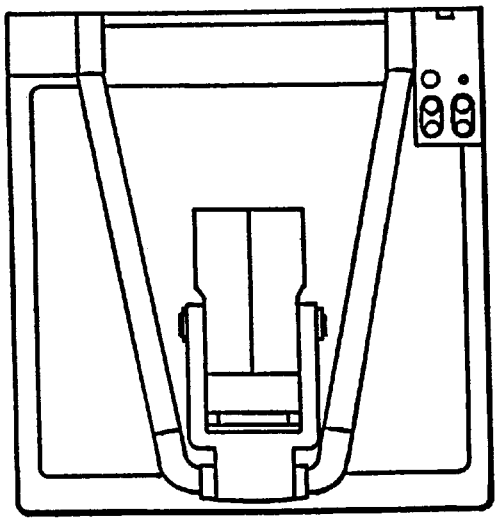

As referred to before, FIGS. 38A, 38B and 38C are the front view, the side view and the plan view, respectively, of the document photographing stand 2004 in the stored condition. As shown in these figures, the stand 2004 has its constituents folded up into a compact form.

As described above, according to the second embodiment, it is possible to provide the desktop type teleconference terminal equipment which is small in size and which is easily portable.

What is claimed is:

1. A communication terminal which transmits and receives images through a communication line, comprising:
   a communication unit which transmits or receives coded still picture data and coded moving picture data through said communication line, said coded still picture data being generated by carrying out a still picture encoding process on a digital image signal, and said coded moving picture data being generated by carrying out a moving picture encoding process on a digital image signal;
   a digital image signal input unit which takes in a digital image signal that is a video signal on which analog/digital (A/D) conversion has been carried out,
   a still picture encoding unit which carries out said still picture encoding process on a digital image signal inputted to generate encoded still picture data and outputs encoded data to said communication unit;
   a moving picture encoding unit which carries out said moving picture encoding process on a digital image signal inputted to generate encoded moving picture data and outputs said encoded data to said communication unit;
   a video switch which selectively inputs said digital image signal taken in by said digital image signal input unit either to said still picture encoding unit or to said moving picture encoding unit, wherein said video switch permits said communication terminal to selectively encode said digital image signal to one of said still picture encoding process or said moving picture encoding process as desired;
   a still picture decoding unit which carries out a still picture decoding process on said coded still picture data received by said communication unit through said communication line to generate a digital image signal;
   a moving picture decoding unit which carries out a moving picture decoding process on the coded moving picture data received by said communication unit through said communication line to generate a digital image signal;
   an image synthesizing unit which selects two digital image signals among said digital image signal taken in by said digital image signal input unit, said digital image signal generated by said still picture decoding unit, and said digital image signal outputted from said moving picture decoding unit and synthesizes said two digital image signals thus selected and outputs them in a manner that respective images of the selected two digital image signals are simultaneously displayed on a display screen of a display device;
   a Digital/Analog (D/A) converter which converts a digital image signal outputted from said image synthesizing unit into a video signal; and
   an output unit which outputs the video signal from said D/A converter.

2. A communication terminal according to claim 1, wherein said image synthesizing unit synthesizes the selected two digital signals in a manner that one image represented by one digital image signal is displayed in overlap with another image represented by another digital image signal.

3. A communication terminal according to claims 1 and 2, further comprising:
   a first storage unit which stores therein said digital image signal taken in by said digital image signal input unit;
   a second storage unit which stores therein said digital image signal from said still picture decoding unit; and
   a third storage unit which stores therein said digital image signal from said moving picture decoding unit,
   wherein said image synthesizing unit generates a synthesized digital image signal and outputs it so that respective images of the selected two digital image signals are simultaneously displayed by controlling writing into and reading from said first to said third storages.

4. A communication terminal according to claim 3, wherein said still picture decoding unit and said moving picture decoding unit each comprise:
   a frame memory used for the decoding process,
   wherein said frame memory in said still picture decoding unit is used as said second storage unit, and said frame memory in said moving picture decoding unit is used as said third storage unit.

5. A communication terminal according to claim 1, further comprising:

a video signal input unit which takes in a video signal;

an Analog/Digital (A/D) converter which converts the video signal taken in by said video signal input unit into a digital image signal and inputs the digital image signal in said digital image signal input unit.

6. An image codec comprising:

a coded image data input unit which takes in coded still picture data and coded moving picture data, said coded still picture data generated by carrying out a still picture encoding process on a digital image signal, and said coded moving picture data generated by carrying out a moving picture encoding process on a digital image signal;

a digital image signal input unit which takes in a digital image signal that is a video signal on which analog/digital (A/D) conversion has been carried out;

a still picture encoding unit which carries out said still picture encoding process on a digital image signal inputted to generate encoded still picture data;

a moving picture encoding unit which carries out said moving picture encoding process on a digital image signal inputted to generate encoded moving picture data;

a video switch which selectively inputs the digital image signal taken in by said digital image signal input unit, either to said still picture encoding unit or to said moving picture encoding means, wherein said video switch permits said communication terminal to selectively encode said digital image signal to one of said still picture encoding process or said moving picture encoding process as desired;

a still picture decoding unit which carries out a still picture decoding process on the coded still picture data taken in by said coded image data input unit to generate a digital image signal;

a moving picture decoding unit which carries out a moving picture decoding process on the coded moving picture data taken in by said coded image data input unit to generate a digital image signal; and an image synthesizing unit which selects two digital image signals among the digital image signal taken in by said digital image signal input unit, the digital image signal from said still picture decoding unit, and the digital image signal from said moving picture decoding unit, synthesizes the selected two digital image signals and outputs them in a manner that respective images of the selected two digital image signals are simultaneously displayed on a display screen of a display device.

7. A picture codec according to claim 6, wherein said image synthesizing unit synthesizes the selected two digital image signals and outputs them in a manner that one image represented by one digital image signal is displayed in overlap manner with another image represented by another digital image signal.

8. A picture codec according to claim 6, further comprising:

a first storage unit which stores therein the digital image signal taken in by said digital image signal input unit;

a second storage unit which stores therein the digital image signal outputted from said still picture decoding unit; and a third storage unit which stores therein the digital image signal from said moving picture decoding unit, wherein said image synthesizing unit generates a synthesized digital image signal, and outputs it so that respective images of the selected two digital image signals are simultaneously displayed on a display screen of a display device by controlling writing into and reading from said first to said third storages.

9. A picture codec according to claim 8, wherein said still picture decoding unit and said moving picture decoding unit each comprises:

a frame memory used for the decoding process, wherein said frame memory in said still picture decoding unit is used as said second storage unit, and said frame memory in said moving picture decoding unit is used as said third storage unit.

10. A picture codec according to claim 6, further comprising:

an Analog/Digital (A/D) converter which converts a video signal inputted to a video signal input unit into a digital image signal to input the digital image signal into said digital image signal input unit; and a Digital/Analog (D/A) converter which converts a digital image signal from said image synthesizing unit into a video signal to output the video signal to a video signal output unit.

11. A communication terminal according to claim 2, further comprising:

a video signal input unit which takes in a video signal;

an Analog/Digital (A/D) converter which converts the video signal taken in by said video signal input unit into a digital image signal and inputs the digital image signal in said digital image signal input unit.

12. A communication terminal according to claim 3, further comprising:

a video signal input unit which takes in a video signal;

an Analog/Digital (A/D) converter which converts the video signal taken in by said video signal input unit into a digital image signal and inputs the digital image signal in said digital image signal input unit.

13. A communication terminal according to claim 4, further comprising:

a video signal input unit which takes in a video signal;

an Analog/Digital (A/D) converter which converts the video signal taken in by said video signal input unit into a digital image signal and inputs the digital image signal in said digital image signal input unit.

14. A picture codec according to claim 7, further comprising:

an Analog/Digital (A/D) converter which converts a video signal inputted to a video signal input unit into a digital image signal to input the digital image signal into said digital image signal input unit; and a Digital/Analog (D/A) converter which converts a digital image signal from said image synthesizing unit into a video signal to output the video signal to a video signal output unit.

15. A picture codec according to claim 8, further comprising:

an Analog/Digital (A/D) converter which converts a video signal inputted to a video signal input unit into a digital image signal to input the digital image signal into said digital image signal input unit; and a Digital/Analog (D/A) converter which converts a digital image signal from said image synthesizing unit into a video signal to output the video signal to a video signal output unit.

16. A picture codec according to claim 9, further comprising:

an Analog/Digital (A/D) converter which converts a video signal inputted to a video signal input unit into a digital image signal to input the digital image signal into said digital image signal input unit; and a Digital/Analog (D/A) converter which converts a digital image signal from said image synthesizing unit into a video signal to output the video signal to a video signal output unit.

* * * * *